(12) United States Patent
Nagoh et al.

(10) Patent No.: US 8,066,917 B2
(45) Date of Patent: Nov. 29, 2011

(54) PHOTOCHROMIC CURABLE COMPOSITION

(75) Inventors: Hironobu Nagoh, Shunan (JP); Junji Takenaka, Shunan (JP)

(73) Assignee: Tokuyama Corporation, Shunan-Shi (JP)

( * ) Notice: Subject to any disclaimer, the term of this patent is extended or adjusted under 35 U.S.C. 154(b) by 0 days.

(21) Appl. No.: 12/680,409

(22) PCT Filed: Dec. 12, 2008

(86) PCT No.: PCT/JP2008/073128
§ 371 (c)(1),
(2), (4) Date: Mar. 26, 2010

(87) PCT Pub. No.: WO2009/075388
PCT Pub. Date: Jun. 18, 2009

(65) Prior Publication Data
US 2010/0230650 A1      Sep. 16, 2010

(30) Foreign Application Priority Data

Dec. 13, 2007   (JP) .................................. 2007-322465

(51) Int. Cl.
*G02B 5/23* (2006.01)
(52) U.S. Cl. ..................... 252/586; 525/330.3; 526/319; 544/148; 546/196
(58) Field of Classification Search ................. 252/586; 549/381, 382, 358; 544/148; 546/196; 526/319; 525/330.3
See application file for complete search history.

(56) References Cited

U.S. PATENT DOCUMENTS

| | | | |
|---|---|---|---|
| 5,395,566 A | 3/1995 | Kobayakawa et al. | |
| 5,462,698 A | 10/1995 | Kobayakawa et al. | |
| 5,708,064 A | 1/1998 | Coleman et al. | |
| 5,739,243 A | 4/1998 | Herold et al. | |
| 5,776,376 A | 7/1998 | Nagoh et al. | |
| 5,973,093 A | 10/1999 | Daughenbaugh et al. | |
| 6,194,511 B1 | 2/2001 | Momoda et al. | |
| 7,169,941 B2 * | 1/2007 | Nagoh et al. | 549/381 |
| 7,763,693 B2 * | 7/2010 | Nagoh et al. | 526/319 |
| 2003/0008958 A1 | 1/2003 | Momoda et al. | |
| 2003/0036579 A1 | 2/2003 | Momoda et al. | |
| 2005/0263745 A1 | 12/2005 | Momoda et al. | |
| 2006/0071203 A1 * | 4/2006 | Mori et al. | 252/586 |
| 2006/0182977 A1 | 8/2006 | Takenaka et al. | |
| 2007/0065633 A1 * | 3/2007 | Mori et al. | 428/137 |

FOREIGN PATENT DOCUMENTS

| | | |
|---|---|---|
| EP | 1130038 A1 | 9/2001 |
| EP | 1607418 A1 | 12/2005 |
| JP | 5-306892 A | 11/1993 |
| JP | 11-246626 A | 9/1999 |
| JP | 2004-050108 * | 2/2004 |
| JP | 2004-50108 A | 2/2004 |
| JP | 2004-262837 A | 9/2004 |
| JP | 2005-23238 A | 1/2005 |
| WO | WO 95/19790 A1 | 4/1995 |
| WO | WO 96/37574 A1 | 11/1996 |
| WO | WO 01/05854 A1 | 1/2001 |
| WO | WO 01/92414 A1 | 12/2001 |
| WO | WO 02/28930 A1 | 4/2002 |
| WO | WO 2004/083268 A1 | 9/2004 |

OTHER PUBLICATIONS

EPO Supplementary European Search Report, Appl. No. 08858708.4, Feb. 9, 2011, pp. 1-5.
International Preliminary Report on Patentability and Written Opinion of the International Search Authority, dated Aug. 19, 2010, for Application No. PCT/JP2008/073128.

* cited by examiner

*Primary Examiner* — Ling Choi
*Assistant Examiner* — Bijan Ahvazi
(74) *Attorney, Agent, or Firm* — Birch, Stewart, Kolasch & Birch, LLP

(57) ABSTRACT

Disclosed is a photochromic curable composition comprising [A] not less than 0.1 part and less than 5 parts by mass of a specific radically polymerizable monomer having an epoxy group, [B] 1.0 to 15 parts by mass of a specific polyfunctional radically polymerizable monomer, [C] 1.0 to 30.0 parts by mass of a specific di(meth)acrylate monomer, [D] more than 50.0 parts and not more than 97.9 parts by mass of a (meth)acrylate monomer except the components [A] to [C] and/or a thio(meth)acrylate monomer, and [E] 0.001 to 10 parts by mass of a photochromic compound based on 100 parts by mass of the total of the polymerizable monomers.

7 Claims, No Drawings

PHOTOCHROMIC CURABLE COMPOSITION

TECHNICAL FIELD

The present invention relates to a photochromic curable composition which can be advantageously used to manufacture a photochromic cured product having an excellent photochromic function.

BACKGROUND OF THE ART

Photochromism is a reversible function that a certain compound changes its color when it is irradiated by sunlight or light including ultraviolet radiation such as light from a mercury lamp and returns to its original color when it is placed in the dark by stopping the irradiation, and used for various applications. Fulgimide compounds, spirooxazine compounds and chromene compounds have been found as photochromic compounds having this photochromism. Since optical goods having photochromic properties can be obtained from complexes of these compounds and plastics, a large number of studies on complexes of photochromic compounds are now under way.

For example, photochromism is applied in the field of eyeglass lenses. A photochromic eyeglass lens comprising a photochromic compound is quickly colored outdoors where it is irradiated by light including ultraviolet radiation like sunlight to serve as a sunglass lens and faded indoors where there is no irradiation to serve as an ordinary transparent eyeglass lens. Demand for this kind of lenses is growing nowadays.

Plastic photochromic eyeglass lenses are particularly preferred from the viewpoints of lightweight and safety. To provide photochromic properties to these plastic lenses, the above photochromic compound is generally compounded. As means of compounding the photochromic compound, there are known a method in which the surface of a lens having no photochromic properties is imbibed with a photochromic compound (to be referred to as "imbibition method" hereinafter) and a method in which a photochromic compound is dissolved in a monomer and the monomer is polymerized to obtain a photochromic lens directly (to be referred to as "casting method" hereinafter). Various proposals are made for the imbibition method (U.S. Pat. Nos. 5,739,243, 5,973,093 and WO95/10790) and the casting method (JP-A 5-306392, WO96/037574, WO01/005854, WO01/092414, WO02/028930 and WO2004/083268).

DISCLOSURE OF THE INVENTION

The following properties are required for these photochromic compounds and plastic optical goods having photochromic properties and containing these photochromic compounds from the viewpoint of a photochromic function: (I) a low degree of coloration (to be referred to as "initial coloration" hereinafter) at a visible range before ultraviolet light is applied, (II) a high degree of coloration (to be referred to as "color optical density" hereinafter) when ultraviolet light is applied, (III) a fast speed from the time when the application of ultraviolet light is stopped to the time when a compound returns to its original state (to be referred to as "fading speed" hereinafter), (IV) high durability of this reversible function, (V) high storage stability, (VI) high moldability of an optical good and (VII) high mechanical strength of an optical good.

With the above technologies in the background, there is proposed a photochromic plastic lens comprising a chromene compound which is hardly decomposed by light and rarely sees a reduction in its color development ability even when sunlight or light similar to sunlight is continuously applied thereto. For example, the above six publications and pamphlets concerning the technology of the casting method introduced above disclose photochromic curable compositions comprising a polymerizable monomer having an acryloyl group or methacryloyl group (to be referred to as "(meth) acrylate monomer" or "di(meth)acrylate monomer" having two (meth)acryl groups), an epoxy compound and a chromene compound. Photochromic cured products (photochromic plastic lenses) having excellent durability can be obtained from these photochromic curable compositions.

However, a discoloration phenomenon that the above photochromic cured products deteriorate in the storage stability of a lens, that is, they are gradually tinged with red which is the developed color or yellow in an inactivated state (yellowing) when these lenses are stored for a long time may occur. Therefore, there is room for improvement. Especially the cured products shown in Examples of the above six publications and pamphlets are not improved in discoloration and not excellent in mechanical properties (tensile strength). Therefore, there is still room for improvement. When a specific chromene compound is used in combination with the polymerizable monomers shown in the above method, it is understood that the above discoloration problem, especially a red discoloration phenomenon markedly appears.

Meanwhile, to use photochromic optical goods for various purposes, they must not only show a good photochromic function but also can be manufactured easily at a low cost and have excellent mechanical or optical properties as photochromic optical goods.

As one of the means of manufacturing the photochromic optical goods at a low cost, there is a mass-production method using a diethylene glycol bisallyl carbonate (may be referred to as commonly called "CR-39" hereinafter) manufacturing tool which is used as a general-purpose material for eyeglass lenses and can provide a cured product having a refractive index of 1.50. If the photochromic optical goods can be mass-produced by using this manufacturing tool, their costs can be reduced. Therefore, the need for this manufacturing tool is high even in the field of photochromic plastic lenses. To manufacture the CR-39 cured product using its manufacturing tool, a casting method using a glass mold may be used as the method of manufacturing a CR-39 cured product, and a photochromic curable composition from which a cured product having a refractive index of 1.50, the same refractive index as that of the CR-39 cured product, can be manufactured is required for the manufacture of a lens having the same diopter with the same mold.

Therefore, the photochromic plastics enumerated in the above imbibition method have a problem that the manufacturing process becomes complicated because the obtained plastic base material is imbibed with a photochromic compound though the manufacturing tool can be shared by manufacturing the plastic base material having a refractive index of 1.50 with the CR-39 manufacturing tool.

The above six publications and pamphlets also propose that a cured product having a refractive index of 1.50 can be obtained from a combination of polymerizable monomers. However, since it contains a large amount of a special acrylate-based material having an epoxy group and a methacryloyl group, there is room for improvement in terms of storage stability as described above. Further, although there is a cured product having a low content of the acrylate-based material, it is unsatisfactory in terms of photochromic properties and the mechanical strength (tensile strength) of the material due to balance with the amount of another polymerizable monomer. Therefore, there is also room for improvement.

Consequently, it is an object of the present invention to provide a photochromic curable composition which can provide a photochromic cured product having excellent photochromic properties for a long time and high mechanical strength (tensile strength) and from which the photochromic cured product can be manufactured at a low cost.

The inventors of the present invention have conducted intensive studies to solve the above problems. As a result, they have found that a photochromic curable composition which can provide a cured product solving the above problems can be obtained by specifying the ratio of a radically polymerizable monomer having an epoxy group and the ratio of a radically polymerizable monomer having a specific structure to the total of all the polymerizable monomers. The present invention has been accomplished based on this finding. They have also found that the above constitution is especially effective for a specific photochromic compound and further that a photochromic curable composition which provides a cured product having a low refractive index and now used most commonly is obtained by making use of this knowledge. The present invention has thus been accomplished.

That is, the present invention is a photochromic curable composition comprising:

[A] Not less than 0.1 part and less than 5.0 parts by mass of a radically polymerizable monomer having an epoxy group represented by the following formula (1):

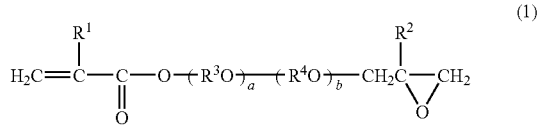

wherein $R^1$ and $R^2$ are each independently a hydrogen atom or methyl group, $R^3$ and $R^4$ are each independently an alkylene group having 1 to 4 carbon atoms which may be substituted by a hydroxyl group, or group represented by the following formula, and "a" and "b" are each a number of 0 to 20 as an average value;

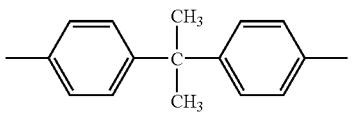

[B] 1.0 to 15.0 parts by mass of a polyfunctional radically polymerizable monomer represented by the following formula (2):

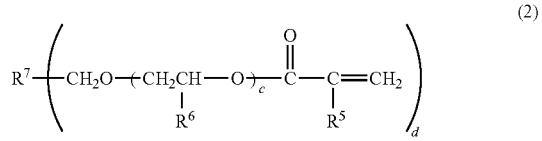

wherein $R^5$ and $R^6$ are each independently a hydrogen atom or alkyl group having 1 to 2 carbon atoms, $R^7$ is a trivalent to hexavalent organic group having 1 to 10 carbon atoms, "c" is a number of 0 to 3 as an average value, and "d" is an integer of 3 to 6;

[C] 1.0 to 30.0 parts by mass of at least one di(meth)acrylate monomer selected from the group consisting of a di(meth)acrylate monomer represented by the following formula (3), di(meth)acrylate monomer represented by the following formula (4) and urethane di(meth)acrylate monomer having a (meth)acryl equivalent of not less than 600:

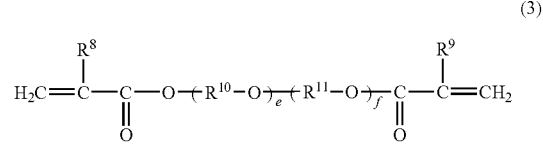

wherein $R^8$ and $R^9$ are each independently a hydrogen atom or methyl group, $R^{10}$ and $R^{11}$ are each independently a linear or branched alkylene group having 2 to 4 carbon atoms, and "e" and "f" are each an integer including "0", with the proviso that when $R^8$ and $R^9$ are both methyl groups, (e+f) is not less than 7 and less than 15 as an average value, when $R^8$ is a methyl group and $R^9$ is a hydrogen atom, (e+f) is not less than 5 and less than 15 as an average value, and when $R^8$ and $R^9$ are both hydrogen atoms, (e+f) is not less than 3 and less than 15 as an average value,

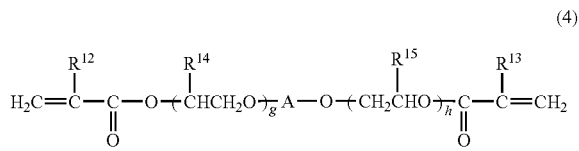

wherein $R^{12}$ and $R^{13}$ are each independently a hydrogen atom or methyl group, $R^{14}$ and $R^{15}$ are each independently a hydrogen atom or methyl group, "A" is a divalent organic group having 1 to 20 carbon atoms, and "g" and "h" are each an integer of not less than 1, with the proviso that when $R^{12}$ and $R^{13}$ are both methyl groups, (g+h) is not less than 7 and less than 15 as an average value, when $R^{12}$ is a methyl group and $R^{13}$ is a hydrogen atom, (g+h) is not less than 5 and less than 15 as an average value, and when $R^{12}$ and $R^{13}$ are both hydrogen atoms, (g+h) is not less than 3 and less than 15 as an average value;

[D] more than 50.0 parts and not more than 97.9 parts by mass of a (meth)acrylate monomer except the above components [A] to [C] and/or a thio(meth)acrylate monomer (the total amount of the components [A], [B], [C] and [D] is 100 parts by mass); and

[E] 0.001 to 10 parts by mass of a photochromic compound based on 100 parts by mass of the total of all the polymerizable monomers.

BEST MODE FOR CARRYING OUT THE INVENTION

In the present invention, the photochromic curable composition comprises [A] a radically polymerizable monomer having an epoxy group represented by the above formula (1), [B] a polyfunctional radically polymerizable monomer represented by the above formula (2), [C] at least one di(meth) acrylate monomer selected from the group consisting of di(meth)acrylate monomers represented by the above formulas (3) and (4) and an urethane di(meth)acrylate monomer having a (meth)acryl equivalent of not less than 600, [D] a (meth)acrylate monomer except the above components [A] to [C] and/or a thio(meth)acrylate monomer, and [E] a photochromic compound.

Component [A]

A description is first given of the component [A], that is, a radically polymerizable monomer having an epoxy group represented by the following formula (1).

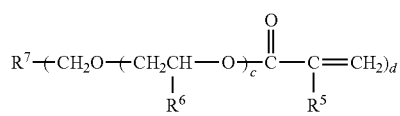

(In the above formula, $R^1$ and $R^2$ are each independently a hydrogen atom or methyl group, $R^3$ and $R^4$ are each independently an alkylene group having 1 to 4 carbon atoms which may be substituted by a hydroxy group, or group represented by the following formula, and "a" and "b" are each a number of 0 to 20 as average values.)

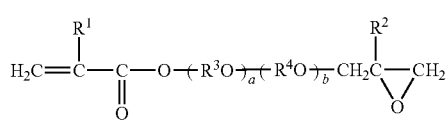

Examples of the alkylene group represented by $R^3$ and $R^4$ include methylene group, ethylene group, propylene group, butylene group, trimethylene group and tetramethylene group. The compound represented by the above formula (1) may be obtained as a mixture of molecules having different molecular weights. Therefore, "a" and "b" are expressed as average values.

Examples of the compound represented by the above formula (1) include glycidyl methacrylate, glycidyloxymethyl methacrylate, 2-glycidyloxyethyl methacrylate, 3-glycidyloxypropyl methacrylate, 4-glycidyloxybutyl methacrylate, polyethylene glycol glycidyl methacrylate having an average molecular weight of 406, polyethylene glycol glycidyl methacrylate having an average molecular weight of 538, polyethylene glycol glycidyl methacrylate having an average molecular weight of 1022, polypropylene glycol glycidyl methacrylate having an average molecular weight of 664, bisphenol A-monoglycidyl ether-methacrylate, 3-(glycidyl-2-oxyethoxy)-2-hydroxypropyl methacrylate, glycidyl acrylate, glycidyloxymethyl acrylate, 2-glycidyloxyethyl acrylate, 3-glycidyloxypropyl acrylate, 4-glycidyloxybutyl acrylate, polyethylene glycol glycidyl acrylate having an average molecular weight of 406, polyethylene glycol glycidyl acrylate having an average molecular weight of 538, polyethylene glycol glycidyl acrylate having an average molecular weight of 1022, 3-(glycidyloxy-1-isopropyloxy)-2-hydroxypropyl acrylate and 3-(glycidyloxy-2-hydroxypropyloxy)-2-hydroxypropyl acrylate. Out of these, glycidyl methacrylate, glycidyloxymethyl methacrylate, 2-glycidyloxyethyl methacrylate, 3-glycidyloxypropyl methacrylate and glycidyl acrylate are preferred, and glycidyl methacrylate is particularly preferred.

Component [B]

A description is subsequently given of the component [B], that is, a polyfunctional radically polymerizable monomer represented by the following formula (2).

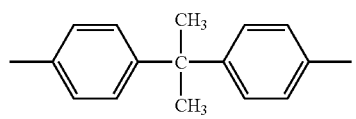

(In the above formula, $R^5$ and $R^6$ are each independently a hydrogen atom or alkyl group having 1 to 2 carbon atoms, $R^7$ is a trivalent to hexavalent organic group having 1 to 10 carbon atoms, c is a number of 0 to 3 as an average value, and d is an integer of 3 to 6.)

In the above formula (2), $R^7$ is a trivalent to hexavalent organic group having 1 to 10 carbon atoms such as an organic group containing a group derived from a polyol, or organic group containing a hydrocarbon group having a functionality of 3 to 15 or an urethane bond having a functionality of 3 to 15.

Specific examples of the polyfunctional radically polymerizable monomer represented by the above formula (2) which can be advantageously used include trimethylolpropane trimethacrylate, trimethylolpropane triacrylate, tetramethylolmethane trimethacrylate, tetramethylolmethane triacrylate, tetramethylolmethane tetramethacrylate, tetramethylolmethane tetraacrylate, trimethylolpropane triethylene glycol trimethacrylate, trimethylolpropane triethylene glycol triacrylate, ditrimethylolpropane tetramethacrylate and ditrimethylolpropane tetraacrylate. These polyfunctional polymerizable monomers may be used in combination of not less than two.

$R^7$ in these polyfunctional polymerizable monomers is preferably a trivalent hydrocarbon group from the viewpoint of fading speed, particularly preferably trimethylolpropane trimethacrylate from the viewpoint of effect.

Component [C]

The di(meth)acrylate monomer as the component [C] is a di(meth)acrylate monomer having a structure represented by the following formula (3).

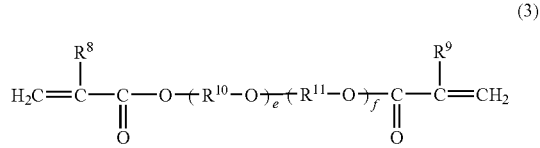

(In the above formula, $R^8$ and $R^9$ are each independently a hydrogen atom or methyl group, $R^{10}$ and $R^{11}$ are each independently a linear or branched alkylene group having 2 to 4 carbon atoms, and "e" and "f" are each an integer including "0", with the proviso that when $R^8$ and $R^9$ are both methyl groups, (e+f) is not less than 7 and less than 15 as an average value, when $R^8$ is a methyl group and $R^9$ is a hydrogen atom, (e+f) is not less than 5 and less than 15 as an average value, and when $R^8$ and $R^9$ are both hydrogen atoms, (e+f) is not less than 3 and less than 15 as an average value.)

The di(meth)acrylate monomer represented by the above formula (3) is generally obtained as a mixture of molecules having different molecular weights. Therefore, "e" and "f" representing the number of alkylene oxide units in the above formula (3) are expressed as the average numbers of units of the whole mixture. "e" and "f" are not less than 0 and less than 15 as average values. When "f" is "0", the number of alkylene oxide units is only one and when "f" is not "0", different types of alkylene oxide units are repeated.

When the di(meth)acrylate monomer is represented by the above formula, to further improve the fading speed as one of the photochromic properties and provide a good result to lens moldability, it is preferred from the viewpoints of the moldability and heat resistance of a cured product that when $R^8$ and $R^9$ are both methyl groups, (e+f) should be not less than 7 and less than 12 as an average value, when $R^8$ is a methyl group and $R^9$ is a hydrogen atom, (e+f) should be not less than 5 and less than 12 as an average value, and when $R^8$ and $R^9$ are both hydrogen atoms, (e+f) should be not less than 3 and less than 12 as an average value.

Preferred examples of the alkylene group represented by $R^{10}$) and $R^{11}$ include alkylene groups having 1 to 4 carbon atoms such as ethylene group, n-propylene group, isopropylene group and tetramethylene group.

Out of these, it is preferred from the viewpoint of obtaining a cured product having excellent color optical density and fading speed out of photochromic properties that $R^8$ in the above formula (3) should be a hydrogen atom (acryloyl group) and from the viewpoint of improving moldability and photochromic properties that the number of the recurring units of the alkylene group represented by $R^{10}$ and $R^{11}$ should be not less than 3 and less than 12.

The di(meth)acrylate monomer as another component [C] is a monomer having a structure represented by the following formula (4).

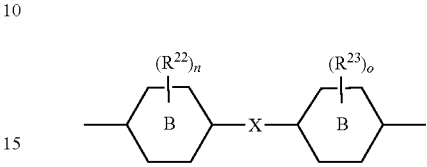

(4)

(In the above formula, $R^{12}$ and $R^{13}$ are each independently a hydrogen atom or methyl group, $R^{14}$ and $R^{15}$ are each independently a hydrogen atom or methyl group, "A" is a divalent organic group having 1 to 20 carbon atoms, and "g" and "h" are each an integer of not less than 1, with the proviso that when $R^{12}$ and $R^{13}$ are both methyl groups, (g+h) is not less than 7 and less than 15 as an average value, when $R^{12}$ is a methyl group and $R^{13}$ is a hydrogen atom, (g+h) is not less than 5 and less than 15 as an average value, and when $R^{12}$ and $R^{13}$ are both hydrogen atoms, (g+h) is not less than 3 and less than 15 as an average value.)

"A" in the above formula (4) is a divalent organic group having 1 to 20 carbon atoms. Preferred examples of the divalent organic group include alkylene groups such as ethylene group, propylene group, butylene group and nonylene group; phenylene groups substituted by a halogen group such as chlorine atom, fluorine atom or bromine atom or an alkyl group having 1 to 4 carbon atoms, and non-substituted phenylene groups; and groups represented by the following formula:

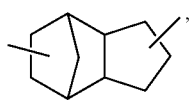

groups represented by the following formula:

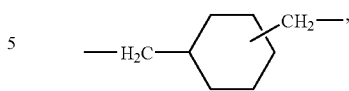

and groups represented by the following formula:

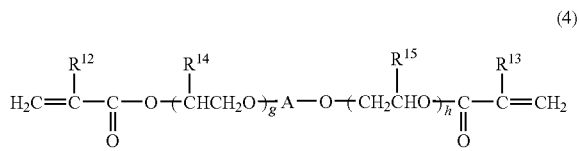

wherein $R^{22}$ and $R^{23}$ are each independently an alkyl group having 1 to 4 carbon atoms, chlorine atom or bromine atom, "n" and "o" are each independently an integer of 0 to 4, the ring represented by the following formula is a benzene ring or cyclohexane ring,

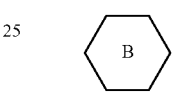

when the ring represented by the following formula is a benzene ring,

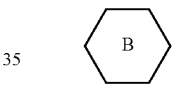

X is a group represented by the following formula, —O—, —S—, —S(O$_2$)—, —C(O)—, —CH$_2$—,

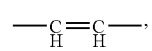

 —C(CH$_3$)$_2$—, —C(CH$_3$)(C$_6$H$_5$)—, or a group represented by the following formula:

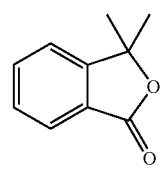

and when the ring represented by the following formula is a cyclohexane ring,

X is a group represented by
—O—, —S—, —CH$_2$—, —C(CH$_3$)$_2$—.

The compound represented by the above formula (4) is obtained as a mixture of molecules having different molecular weights. Therefore, "g" and "h" are expressed as average values. "g" and "h" are each an integer of not less than 1. With the proviso that when $R^{12}$ and $R^{13}$ are both methyl groups, (g+h) is not less than 7 and less than 15 as an average value, when $R^{12}$ is a methyl group and $R^{13}$ is a hydrogen atom, (g+h) is not less than 5 and less than 15 as an average value, and when $R^{12}$ and $R^{13}$ are both hydrogen atoms, (g+h) is not less than 3 and less than 15 as an average value. Preferably, when $R^{12}$ and $R^{13}$ are both methyl groups, (g+h) is not less than 7 and less than 12 as an average value, when $R^{12}$ is a methyl group and $R^{13}$ is a hydrogen atom, (g+h) is not less than 5 and less than 12 as an average value, and when $R^{12}$ and $R^{13}$ are both hydrogen atoms, (g+h) is not less than 3 and less than 12 as an average value. This is preferred from the viewpoints of the moldability and heat resistance of a cured product.

It is particularly preferred that $R^{12}$ and $R^{13}$ in the above formula (4) should be both methyl groups (methacryloyl group) because a cured product having high color optical density and fading speed in photochromic properties is obtained and that (g+h) should be not less than 7 and less than 12 from the viewpoint of improving photochromic properties.

Further, the di(meth)acrylate monomer as still another component [C] is an urethane di(meth)acrylate monomer having a (meth)acryl equivalent of not less than 600. The term "(meth)acryl equivalent" is a value obtained by dividing the molecular weight of the monomer by the number of (meth) acryl groups. The urethane di(meth)acrylate monomer used as the component [C] in the present invention is a bifunctional urethane di(meth)acrylate monomer having an acryl equivalent of not less than 600 and two urethane structures in the molecule. The upper limit value of the (meth)acryl equivalent is not particularly limited but preferably 5,000 when acquisition ease and handling ease are taken into account and more preferably 1,000 when the heat resistance and moldability of a photochromic cured product are taken into account.

Out of these, an urethane di(meth)acrylate monomer which satisfies the above requirements and has no aromatic ring in the molecular structure is preferred from the viewpoint of the light resistance of the obtained cured product, and an urethane di(meth)acrylate monomer which does not yellow is particularly preferred. More specifically, it is an urethane di(meth) acrylate monomer having a molecular weight of 1,300 to 10,000 obtained by reacting hexamethylene diisocyanate, isophorone diisocyanate, lydine isocyanate, 2,2,4-hexamethylene diisocyanate, dimeric acid diisocyanate, isopropylidenebis-4-cyclohexyl isocyanate, dicyclohexylmethane diisocyanate, norbornene diisocyanate or methylcyclohexane diisocyanate with a polyalkylene glycol having a recurring unit such as ethylene oxide, propylene oxide or hexamethylene oxide having 2 to 4 carbon atoms, or a known diol such as polyester diol exemplified by polycaprolactone diol, polycarbonate diol or polybutadiene diol to obtain an urethane polymer and further reacting it with 2-hydroxy(meth)acrylate.

A description is subsequently given of the effect of the di(meth)acrylate monomer as the component [C] and exemplary compounds thereof.

The di(meth)acrylate monomers represented by the above formulas (3) and (4) and the urethane di(meth)acrylate monomer are preferably monomers having such flexibility that when only the di(meth)acrylate monomer is polymerized at a polymerization rate of not less than 90%, the obtained cured product has a Rockwell hardness of not more than 40. The component [C] is a component for improving color developing and fading speeds out of photochromic properties.

In the present invention, the di(meth)acrylate monomer as the component [C] must be bifunctional. When a cured product having the same composition as that of the present invention is obtained by using a similar monofunctional (meth) acrylate monomer, the photochromic color developing and fading abilities of the cured product are the same as those of the present invention. However, when a monofunctional (meth)acrylate monomer is used, the polymerization rate tends to drop as compared with other components, and the monofunctional (meth)acrylate monomer is apt to remain as an unpolymerized component. Therefore, when moldability is evaluated, the unpolymerized component causes a phenomenon that a portion in contact with a glass mold of a cured product may be "torn off" at the time of release, or reduces the heat resistance of the cured product disadvantageously. For the above reasons, the component [C] used in the present invention must be a bifunctional di(meth)acrylate monomer.

Examples of the di(meth)acrylate monomer represented by the above formula (3) which satisfies the above requirement include polyethylene glycol dimethacrylate (e=9, f=0) having an average molecular weight of 536, polytetramethylene glycol dimethacrylate (e=14, f=0) having an average molecular weight of 736, polypropylene glycol dimethacrylate (e=7, f=0) having an average molecular weight of 536, polyethylene glycol diacrylate (e=3, f=0) having an average molecular weight of 258, polyethylene glycol diacrylate (e=4, f=0) having an average molecular weight of 308, polyethylene glycol diacrylate (e=9, f=0) having an average molecular weight of 522, polyethylene glycol methacrylate acrylate (e=9, f=0) having an average molecular weight of 536, and polyethylene and polypropylene glycol diacrylate (e+f=4) having an average molecular weight of 330.

Examples of the di(meth)acrylate monomer represented by the above formula (4) include ethoxylated cyclohexanedimethanol acrylate (g+h=4), 2,2-bis[4-methacryloxy.polyethoxy]phenyl)propane (g+h=10), 2,2-bis[4-acryloxy.diethoxy]phenyl)propane (g+h=4) and 2,2-bis[4-acryloxy.polyethoxy]phenyl)propane (g+h=10).

Examples of the urethane di(meth)acrylate monomer having a (meth)acryl equivalent of not less than 600 include the U-108A, U-200PA, UA-511, U-412A, UA-4100, UA-4200, UA-4400, UA-2235PE, UA-160™, UA-6100, UA-6200, U-108, UA-4000 and UA-512 of Shin-Nakamura Chemical Co., Ltd. and the UX-2201, UX3204, UX4101, 6101, 7101 and 8101 of Nippon Kayaku Co., Ltd.

In the present invention, at least one di(meth)acrylate monomer selected from the group consisting of the di(meth) acrylate monomer represented by the above formula (3), the di(meth) acrylate monomer represented by the above formula (4) and the urethane di(meth)acrylate monomer having a (meth)acryl equivalent of not less than 600 is used. The di(meth)acrylate monomer represented by the above formula (3), the di(meth) acrylate monomer represented by the above formula (4) and the urethane di(meth)acrylate monomer having a (meth)acryl equivalent of not less than 600 may be each a mixture of a plurality of compounds.

Component [D]

A description is subsequently given of the component [D], that is, a (meth)acrylate monomer except the above components [A] to [C] and/or a thio(meth)acrylate monomer.

The photochromic curable composition of the present invention comprises a known (meth)acrylate monomer different from the above components [A], [B] and [C] and/or a thio(meth)acrylate monomer, in addition to the above radically polymerizable monomers [A], [B] and [C].

Examples of the component [D] include polyester oligomer hexaacrylate, caprolactone modified dipentaerythritol hexaacrylate, tetrafunctional polyester oligomers having a molecular weight of 2,500 to 3,500 (EB80 of Daicel UCB Co., Ltd., etc.), tetrafunctional polyester oligomers having a molecular weight of 6,000 to 8,000 (EB450 of Daicel UCB Co., Ltd., etc.), hexafunctional polyester oligomers having a molecular weight of 45,000 to 55,000 (EB1830 of Daicel UCB Co., Ltd., etc.), tetrafunctional polyester oligomers having a molecular weight of 10,000 (GX8488B of Dai-Ichi Kogyo Seiyaku Co., Ltd., etc.), 2-hydroxy methacrylate, 2-hydroxy acrylate, diethylene glycol dimethacrylate, triethylene glycol dimethacrylate, tetraethylene glycol dimethacrylate, pentaethylene glycol dimethacrylate, tripropylene glycol dimethacrylate, tetrapropylene glycol dimethacrylate, pentapropylene glycol dimethacrylate, dimethacrylate comprising a mixture of polypropylene glycol and polyethylene glycol (polyethylene has two recurring units and polypropylene has two recurring units), ethylene glycol bisglycidyl methacrylate, bisphenol A dimethacrylate, 2,2-bis(4-methacryloyloxyethoxyphenyl)propane, 2,2-bis(3,5-dibromo-4-methacryloyloxyethoxyphenyl)propane, 1,4-butyleneglycol dimethacrylate, 1,9-nonylene glycol dimethacrylate, neopentylene glycol dimethacrylate, bis(2-methacryloyloxyethylthioethyl)sulfide, bis(methacryloyloxyethyl)sulfide, bis(acryloyloxyethyl) sulfide, 1,2-bis (methacryloyloxyethylthio) ethane, 1,2-bis (acryloyloxyethyl)ethane, bis(2-methacryloyloxyethylthioethyl) sulfide, bis(2-acryloyloxyethylthioethyl) sulfide, 1,2-bis (methacryloyloxyethylthioethylthio) ethane, 1,2-bis (acryloyloxyethylthioethylthio) ethane, 1,2-bis (methacryloyloxyisopropylthioisopropyl) sulfide, 1,2-bis (acryloyloxyisopropylthioisopropyl) sulfide, stearyl methacrylate, lauryl methacrylate, methyl acrylate, ethyl acrylate, butyl acrylate, octyl acrylate, lauryl acrylate, acrylic acid, methacrylic acid and unsaturated carboxylic acids such as maleic anhydride; ester compounds of acrylic acid or methacrylic acid such as methyl methacrylate, benzyl methacrylate, phenyl methacrylate and 2-hydroxyethyl methacrylate; and ester compounds of thioacrylic acid or thiomethacrylic acid such as methylthio acrylate, benzylthio acrylate and benzyl thiomethacrylate, or polyfunctional urethane (meth) acrylates having a (meth)acryl equivalent of not less than 100 and less than 600, especially polyvalent urethane (meth)acrylates having a (meth)acryl equivalent of not less than 100 and less than 600, such as urethane di(meth)acrylate.

The above polyvalent urethane (meth)acrylates include polyfunctional urethane (meth)acrylate monomers having a (meth)acryl equivalent of not less than 100 and less than 600 and not less than two urethane structures in the molecule. Out of these, a polyfunctional urethane (meth)acrylate monomer which has no aromatic ring in the molecular structure and does not yellow is preferred from the viewpoint of the light resistance of a cured resin. More specifically, the polyfunctional urethane (meth) acrylate monomer is a reaction mixture obtained by reacting hexamethylene diisocyanate, isophorone diisocyanate, lysine isocyanate, 2,2,4-hexamethylene diisocyanate, dimeric acid diisocyanate, isopropylidenebis-4-cyclohexyl isocyanate, dicyclohexylmethane diisocyanate, norbornene diisocyanate or methylcyclohexane diisocyanate with a low molecular weight polyfunctional polyol such as a polyalkylene glycol having a recurring unit such as ethylene oxide, propylene oxide or hexamethylene oxide having 2 to 4 carbon atoms or polyester diol exemplified by polycaprolactone diol, polycarbonate diol or polybutadiene diol, or a known low molecular weight diol such as pentaerythritol, ethylene glycol, propylene glycol, 1,3-propanediol, 1,4-butanediol, 1,5-pentanediol, 1,6-hexanediol, 1,9-nonanediol, 1,8-nonanediol, neopentyl glycol, diethylene glycol, dipropylene glycol, 1,4-cyclohexanediol, 1,4-cyclohexanedimethanol, glycerin, trimethylolpropane or pentaerythritol to obtain an urethane prepolymer and further reacting it with 2-hydroxy(meth) acrylate, or a reaction mixture obtained by directly reacting the above diisocyanate with 2-hydroxy(meth)acrylate. It is an urethane (meth)acrylate monomer having a molecular weight of preferably not less than 400 and less than 2,500, more preferably not less than 400 and less than 1,300. The number of functional groups of the (meth)acrylate is preferably 2 to 15. When the number of functional groups is large, the obtained photochromic cured product may become brittle. Therefore, an urethane di(meth)acrylate monomer having 2 functional groups is preferred. When the urethane (meth) acrylate monomer is bifunctional, its (meth)acryl equivalent is preferably not less than 200 and less than 600 because its effect of improving mechanical properties is large. Specific examples of the urethane (meth)acrylate monomer include polyfunctional U-4HA (molecular weight of 596, 4 functional groups), U-6HA (molecular weight of 1019, 6 functional groups), U-6LPA (molecular weight of 818, 6 functional groups), U-15HA (molecular weight of 2,300, 15 functional groups), and bifunctional U-2PPA (molecular weight of 482), UA-122P (molecular weight of 1,100) and U-122P (molecular weight of 1,100) (of Shin-Nakamura Chemical Co., Ltd.) and EB4858 (molecular weight of 454) (of Daicel UCB Co., Ltd.).

The above components [D] may be used alone or in combination of two or more.

Out of the above components [D], a di(meth)acrylate monomer represented by the following formula (6) is particularly preferably used to obtain a low-refractive index photochromic cured product having a refractive index of 1.49 to 1.51.

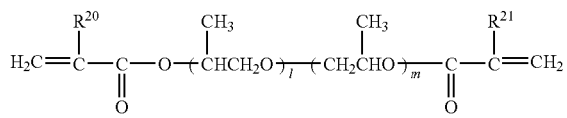

(6)

$$H_2C=\overset{R^{20}}{\underset{\overset{\|}{O}}{C}}-O\!\!\!-\!\!\!(CHCH_2O)_{\overline{l}}\!\!-\!\!(CH_2CHO)_{\overline{m}}\!\!-\!\!\overset{R^{21}}{\underset{\overset{\|}{O}}{C}}\!\!=\!\!CH_2$$
with CH$_3$ substituents shown on the chain carbons.

(In the above formula, $R^{20}$ and $R^{21}$ are each independently a hydrogen atom or methyl group, and "l" and "m" are each an integer of not less than 0, with the proviso that when $R^{20}$ and $R^{21}$ are both methyl groups, (l+m) is not less than 2 and less than 7 as an average value, when $R^{20}$ is a methyl group and $R^{21}$ is a hydrogen atom, (l+m) is not less than 2 and less than 5 as an average value, and when $R^{20}$ and $R^{21}$ are both hydrogen atoms, (l+m) is not less than 2 and less than 3 as an average value.)

The di(meth)acrylate monomer represented by the above formula (6) is generally obtained as a mixture of molecules having different molecular weights. Therefore, "l" and "m" are expressed as average values.

Examples of the di(meth)acrylate monomer represented by the above formula (6) include di(meth)acrylate monomers such as tripropylene glycol dimethacrylate and tetrapropylene glycol dimethacrylate. Further, when the di(meth)acrylate monomer represented by the above formula (6) is used, the numbers of carbon atoms and hydrogen atoms become too large in the resin structure, whereby the resin may become brittle. Therefore, a photochromic composition which improves resin strength by mixing a photochromic composition containing the above polyfunctional urethane (meth) acrylate having a (meth)acryl equivalent of not less than 100 and less than 600 is preferred.

As another optimal combination, to obtain a photochromic cured product having a refractive index of 1.52 to 1.57, a bifunctional (meth)acrylate monomer represented by the following formula (5) is preferably used as the component [D].

In the present invention, the content of the component [A] is preferably 0.1 to 3 parts by mass based on the same standard as above in order to prevent the red discoloration along the passage of time and yellowing in an inactivated state of the obtained photochromic cured product. The content of the component [B] is preferably 3.0 to 10.0 parts by mass, particularly preferably 5.0 to 7.0 parts by mass based on the same

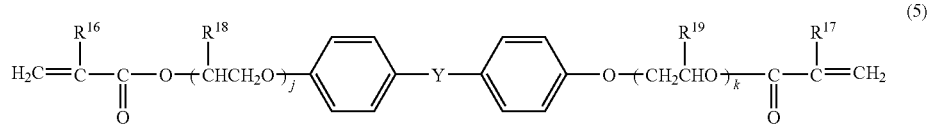

(5)

(In the above formula, $R^{16}$ and $R^{17}$ are each independently a hydrogen atom or methyl group, $R^{18}$ and $R^{19}$ are each independently a hydrogen atom or methyl group, the group Y is any one of the groups
—O—, —S—, —S(O$_2$)—, —C(O)—, —CH$_2$—,

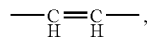

—C(CH$_3$)$_2$—, —C(CH$_3$)(C$_6$H$_5$)—,
and "j" and "k" are each an integer of not less than 1, with the proviso that when $R^{16}$ and $R^{17}$ are both methyl groups, (j+k) is not less than 2 and less than 7 as an average value, when $R^{16}$ is a methyl group and $R^{17}$ is a hydrogen atom, (j+k) is not less than 2 and less than 5 as an average value, and when $R^{16}$ and $R^{17}$ are both hydrogen atoms, (j+k) is not less than 2 and less than 3 as an average value.)

The bifunctional (meth)acrylate monomer represented by the above formula (5) is generally obtained as a mixture of molecules having different molecular weights. Therefore, "j" and "k" are expressed as average values.

Examples of the compound represented by the above formula (5) include bisphenol A dimethacrylate, 2,2-bis(4-methacryloyloxyethoxyphenyl) propane, 2,2-bis(3,5-dibromo-4-methacryloyloxyethoxyphenyl) propane, 2,2-bis(4-methacryloyloxydipropoxyphenyl) propane and bisphenol A diacrylate.

2,2-bis(4-methacryloyloxyethoxyphenyl) propane in which the average value of (j+k) is 2.6 is preferably used from the viewpoints of mechanical strength and moldability.

Ratio of Each Component to the Total of Polymerizable Monomers

The polymerizable monomers used in the present invention are [A] a radically polymerizable monomer having an epoxy group, [B] a polyfunctional radically polymerizable monomer, [C] at least one (meth)acrylate monomer selected from the group consisting of a di(meth)acrylate monomer represented by the above formula (3), a di(meth)acrylate monomer represented by the above formula (4) and an urethane di(meth)acrylate monomer having a (meth)acryl equivalent of not less than 600, and [D] a (meth)acrylate monomer and/or a (meth)thioacrylate monomer described above. As for the ratio of each component, the content of the component [A] is not less than 0.1 part and less than 5.0 parts by mass, the content of the component [B] is 1.0 to 15.0 parts by mass, the content of the component [C] is 1.0 to 30.0 parts by mass, and the content of the component [D] is more than 50.0 parts and not more than 97.9 parts by mass. The total amount of the components [A], [B], [C] and [D] is 100 parts by mass.

standard from the viewpoints of the effect of improving the fading speed of the obtained photochromic cured product and the mechanical strength of the material when the total amount of all the polymerizable monomers is 100 parts by mass. The content of the component [C] is preferably 3.0 to 20.0 parts by mass, particularly preferably 5.0 to 15.0 parts by mass based on the same standard from the viewpoints of the effect of improving the fading speed of the obtained photochromic cured product and the heat resistance of the material. The component [D] is mixed in an amount that ensures that the total amount of the components [A], [B], [C] and [D] becomes 100 parts by mass.

In the present invention, the obtained photochromic cured product exhibits an excellent effect when the above ratio of the components [A], [B] and [C] is satisfied. Even when the refractive index of the photochromic cured product obtained from the component [D] is adjusted, the red discoloration along the passage of time and yellowing in an inactivated state of the photochromic cured product can be prevented, and a photochromic cured product having excellent photochromic properties and high mechanical strength and heat resistance can be obtained.

To obtain a photochromic cured product having a refractive index of 1.49 to 1.51 from the photochromic curable composition of the present invention, preferably, the content of the di(meth)acrylate monomer represented by the above formula (6) is preferably 25 to 95% by mass, more preferably 30 to 75% by mass, the content of the polyfunctional urethane (meth)acrylate having a (meth)acryl equivalent of not less than 100 and less than 600 is preferably 5 to 75% by mass, more preferably 25 to 70% by mass based on 100% by mass of the total of the components [D], and the di(meth)acrylate monomer as the component [C] is preferably a di(meth)acrylate monomer represented by the above formula (3). Out of the di(meth)acrylate monomers represented by the above formula (6), tripropylene glycol dimethacrylate and tetrapropylene glycol dimethacrylate are particularly preferred. Out of the polyfunctional urethane (meth)acrylates having a (meth) acryl equivalent of not less than 100 and less than 600, a bifunctional urethane (meth)acrylate monomer having a (meth)acrylate equivalent of not less than 200 and less than 600 is particularly preferred. Further, out of the di(meth) acrylate monomers represented by the above formula (3), polyethylene glycol dimethacrylate (e=9, f=0) having an average molecular weight of 536, polytetramethylene glycol dimethacrylate (e=14, f=0) having an average molecular weight of 736, polypropylene glycol dimethacrylate (e=7, f=0) having an average molecular weight of 536, polyethylene glycol diacrylate (e=3, f=0) having an average molecular weight of 258, polyethylene glycol diacrylate (e=4, f=0) having an average molecular weight of 308 and polyethylene glycol diacrylate (e=9, f=0) having an average molecular weight of 522 are particularly preferred. A photochromic curable composition having this constitution is preferred in terms of photochromic properties and mechanical strength.

To adjust the refractive index, triethylene glycol dimethacrylate or tetraethylene glycol dimethacrylate which is a di(meth)acrylate monomer having not less than 3 and less than 5 ethylene glycol chains as the recurring unit may be used as the component [D]. In this case, 40 to 63% by mass of the di(meth)acrylate monomer represented by the above formula (6), 25 to 37% by mass of the polyfunctional urethane (meth)acrylate having a (meth)acryl equivalent of not less than 100 and less than 600 and 0 to 35% by mass of the above di(meth)acrylate monomer having not less than 3 and less than 5 ethylene glycol chains as the recurring unit may be used.

To obtain a photochromic cured product having a refractive index of 1.52 to 1.57 from the photochromic curable composition of the present invention, preferably, the content of the di(meth)acrylate monomer represented by the above formula (5) is not less than 25% by mass based on 100% by mass of the total of all the components [D], and the di(meth)acrylate monomer as the component [C] is a di(meth)acrylate monomer represented by the above formula (4). Out of the di(meth)acrylate monomers represented by the above formula (5), 2,2-bis(4-methacryloyloxyethoxyphenyl) propane having an average value of (j+k) of 2.6 is particularly preferred. Out of the di(meth)acrylate monomers represented by the above formula (4), 2,2-bis[4-methacryloxy.polyethoxy]phenyl]propane (g+h=10), 2,2-bis[4-acryloxy.diethoxy]phenyl]propane (g+h=4) and 2,2-bis[4-acryloxy.polyethoxy]phenyl]propane (g+h=10) are particularly preferred. The photochromic properties and mechanical strength of a photochromic cured product obtained from the photochromic curable composition having this constitution can be further improved.

As the rest of the component [D], triethylene glycol dimethacrylate or tetraethylene glycol dimethacrylate which is a di(meth)acrylate monomer having not less than 3 and less than 5 ethylene glycol chains as the recurring unit may be used to adjust the refractive index.

Further, a known polymerization control agent is preferably added to the photochromic composition of the present invention in order to improve the moldability of the photochromic curable composition. Examples of the known polymerization control agent include thiols such as t-dodecylmercaptan, α-methylstyrene and α-methylstyrene dimer. In the present invention, α-methylstyrene dimer or a combination of α-methylstyrene and α-methylstyrene dimer is particularly preferred and the amount thereof is preferably 1 to 10 parts by mass based on 100 parts by mass of the total of the polymerizable monomers of the present invention.

Component [E]

A description is subsequently given of the photochromic compound as the component [E].

The photochromic compound is used in an amount that ensures that desired photochromic properties are obtained. The content of the component [E] is preferably 0.001 to 10 parts by mass based on 100 parts by mass of the total of the above polymerizable monomers (components [A], [B], [C] and [D]). The photochromic curable composition of the present invention is particularly preferably used to manufacture a plastic lens by a casting process. Since a cured product of the photochromic curable composition is used as a plastic lens directly in this case, the content of the photochromic compound is more preferably 0.001 to 2 parts by mass, more preferably 0.001 to 1 part by mass based on 100 parts by mass of the total of the above polymerizable monomers.

A compound which shows a photochromic function may be used as the photochromic compound. Photochromic compounds such as fulgide compounds, chromene compounds and spirooxazine compounds are well known and may be used in the present invention. Known fulgide compounds and chromene compounds disclosed by U.S. Pat. Nos. 4,882,438, 4,960,678, 5,130,058 and 5,106,998 can be advantageously used.

Compounds newly discovered by the inventors of the present invention as compounds having excellent photochromic properties, such as compounds disclosed by JP-A 2001-114775, JP-A 2001-031670, JP-A 2001-011067, JP-A 2001-011066, JP-A 2000-347346, JP-A 2000-344762, JP-A 2000-344761, JP-A 2000-327676, JP-A 2000-327675, JP-A 2000-256347, JP-A 2000-229976, JP-A 2000-229975, JP-A 2000-229974, JP-A 2000-229973, JP-A 2000-229972, JP-A 2000-219687, JP-A 2000-219686, JP-A 2000-219685, JP-A 1-322739, JP-A 11-286484, JP-A 11-279171, JP-A 10-298176, JP-A 09-218301, JP-A 09-124645, JP-A 08-295690, JP-A 08-176139 and JP-A 08-157467 can also be advantageously used.

Out of these, photochromic compounds disclosed by WO01/60811, U.S. Pat. Nos. 4,913,544 and 5,623,005 can be advantageously used. Out of these photochromic compounds, chromene-based photochromic compounds can be particularly advantageously used because they have higher photochromic properties durability than other photochromic compounds and the effect of improving color optical density and fading speed which are photochromic properties by the present invention is greater than that of other photochromic compounds.

Further, out of these chromene-based photochromic compounds, compounds represented by the following formula (7) can be advantageously used because the red discoloration of the obtained photochromic cured product at the time of storage is rare.

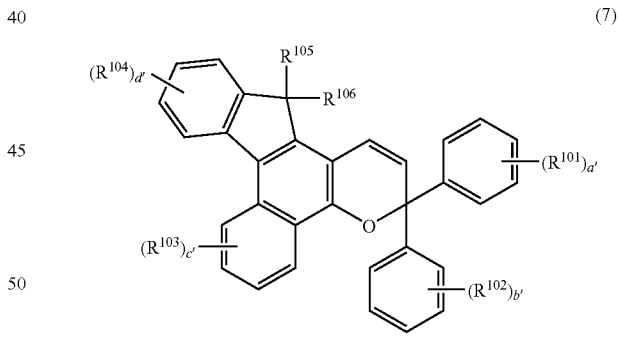

{In the above formula, $R^{101}$ is a cyclic or acyclic monovalent amino group having 2 to 10 carbon atoms which may contain a hetero atom except nitrogen, $R^{102}$, $R^{103}$, $R^{105}$ and $R^{106}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{105}$ and $R^{106}$ may be bonded together to form a ring, "a'", "b'", "c'" and "d'" represent the numbers of substituents of $R^{101}$, $R^{102}$, $R^{103}$ and $R^{104}$, respectively, "a'" and "b'" are each an integer of 0 to 5, and "c'" and "d'" are each an integer of 0 to 4, with the proviso that when "a'", "b'", "c'"

and "d'" are each not less than 2, R$^{101}$'s, R$^{102}$'s, R$^{103}$'s and R$^{104}$'s may be the same or different.}

The cyclic or acyclic monovalent amino group (R$^{101}$) having 2 to 10 carbon atoms which may contain a hetero atom except nitrogen obtains the effect of preventing red discoloration when it is used in combination with the radically polymerizable monomers used in the present invention. Therefore, the cyclic amino group is preferably a pyrrolidinyl group, piperidinyl group or morpholino group, and the acyclic amino group is preferably a dialkylamino group having not more than 6 alkyl carbon atoms, particularly preferably N,N-dimethylamino group or N,N-diethylamino group.

R$^{102}$, R$^{103}$, R$^{104}$, R$^{105}$, and R$^{106}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group as described above.

The alkyl group is preferably an alkyl group having 1 to 9 carbon atoms. Preferred examples of the alkyl group include methyl group, ethyl group, n-propyl group, isopropyl group, n-butyl group, sec-butyl group and tert-butyl group.

The cycloalkyl group is preferably an alkyl group having 3 to 12 carbon atoms. Preferred examples of the alkyl group include cyclopropyl group, cyclobutyl group, cyclopentyl group, cyclohexyl group, cycloheptyl group and cyclooctyl group.

The alkoxy group is preferably an alkoxy group having 1 to 5 carbon atoms. Preferred examples of the alkoxy group include methoxy group, ethoxy group, n-propoxy group, iso-propoxy group, n-butoxy group, sec-butoxy group and tert-butoxy group.

The aralkyl group is preferably an aralkyl group having 7 to 11 carbon atoms. Preferred examples of the aralkyl group include benzyl group, phenylethyl group, phenylpropyl group and phenylbutyl group.

The aralkoxy group is preferably an aralkoxy group having 6 to 10 carbon atoms. Preferred examples of the aralkoxy group include phenoxy group and naphthoxy group.

The aryl group is preferably an aromatic hydrocarbon group having 6 to 10 carbon atoms or aromatic heterocyclic group having 4 to 12 carbon atoms which form a ring. Preferred examples of the aryl group include phenyl group, naphthyl group, thienyl group, furyl group, pyrrolinyl group, pyridyl group, benzothienyl group, benzofuranyl group and benzopyrrolinyl group.

A substituted aryl group obtained by substituting at least one hydrogen atom of the aryl group with a substituent such as the above alkyl group, alkoxy group, aralkyl group or aralkoxy group may also be preferably used.

The substituted amino group having an alkyl group or aryl group is preferably an alkylamino group, dialkylamino group, arylamino group or diarylamino group. Examples of the substituted amino group include methylamino group, ethylamino group, phenylamino group, dimethylamino group, diethylamino group and diphenylamino group.

The heterocyclic group has a nitrogen atom as a hetero atom and is bonded by the nitrogen atom. Examples of the heterocyclic group include morpholino group, piperidino group, pyrrolidinyl group, piperazino group, N-methylpiperazino group and indolinyl group.

Examples of the halogen atom are fluorine atom, chlorine atom, bromine atom and iodine atom.

The halogenoalkyl group is obtained by substituting at least one hydrogen atom of the above alkyl group with a fluorine atom, chlorine atom or bromine atom. Out of these, a halogenoalkyl group obtained by substituting the hydrogen atom with a fluorine atom is preferred. Preferred examples of the halogenoalkyl group include fluoromethyl group, difluoromethyl group and trifluoromethyl group.

The halogenoalkoxy group is obtained by substituting at least one hydrogen atom of the above alkoxy group with a fluorine atom, chlorine atom or bromine atom. Out of these, a halogenoalkoxy group obtained by substituting the hydrogen atom with a fluorine atom is preferred. Preferred examples of the halogenoalkoxy group include fluoromethoxy group, difluoromethoxy group and trifluoromethoxy group.

The ring formed by bonding together R$^{105}$ and R$^{106}$ is preferably an aliphatic hydrocarbon ring having 4 to 10 carbon atoms which form a ring. Further, an aromatic hydrocarbon ring such as benzene, naphthalene or naphthalene may be condensed with the aliphatic hydrocarbon ring. The aliphatic hydrocarbon ring may have an alkyl group or alkoxy group having 1 to 5 carbon atoms as a substituent. The rings shown below are particularly preferred. In the rings shown below, the carbon atom (spiro carbon atom) having two bonds at the lowest position corresponds to the carbon atom of a 5-membered ring to which R$^{105}$ and R$^{106}$ are bonded.

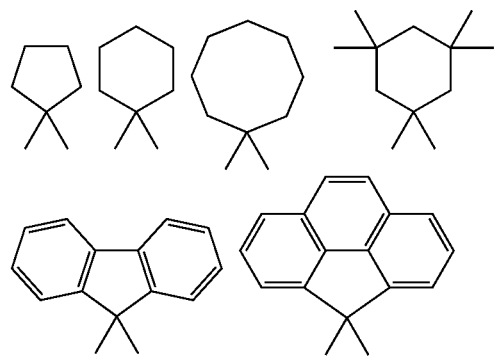

"a'", "b'", "c'" and "d'" represent the numbers of substituents of R$^{101}$, R$^{102}$, R$^{103}$, and R$^{104}$, respectively, "a'" and "b'" are each an integer of 0 to 5, and "c'" and "d'" are each an integer of 0 to 4, with the proviso that when "a'", "b'", "c'" and "d'" are each not less than 2, R$^{101}$'s R$^{102}$'s, R$^{103}$'s and R$^{104}$'s may be the same or different.

Out of these chromene compounds, chromene compounds represented by the following structural formulas are particularly preferred.

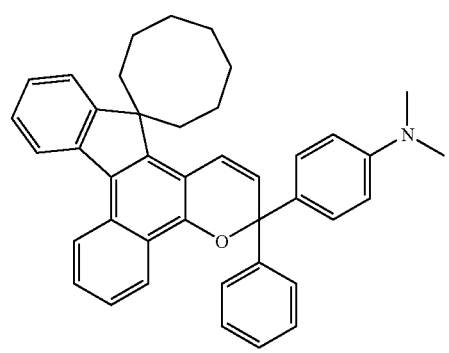

-continued

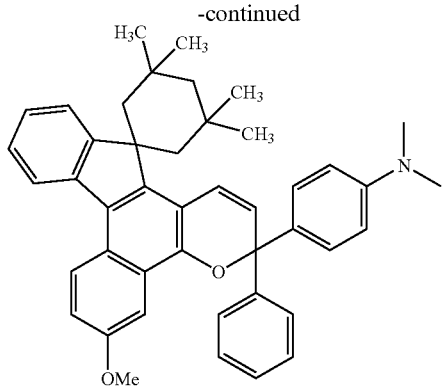

Further, since the obtained photochromic cured product rarely yellows at the time of storage when a compound represented by the following formula (8) is combined with the compound represented by the above formula (7), the compound represented by the following formula (8) is preferably used in combination.

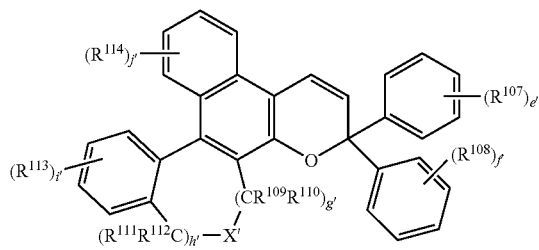

{In the above formula, $R^{107}$, $R^{108}$, $R^{113}$, and $R^{114}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{109}$, $R^{110}$, $R^{111}$, and $R^{112}$ are each independently a hydrogen atom, hydroxyl group, alkyl group, cycloalkyl group, alkoxyl group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{109}$ and $R^{110}$, $R^{111}$ and $R^{112}$, and $R^{109}$ and $R^{111}$ may be bonded together to form a ring, and X' is an oxygen atom, single bond, group represented by the following formula (9):

$$CR^{115}R^{116} \qquad (9)$$

(in the above formula, $R^{115}$ and $R^{116}$ are each independently a hydrogen atom, hydroxyl group, alkyl group, cycloalkyl group, alkoxyl group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, and $R^{115}$ and $R^{116}$ may be bonded together to form a ring.) or group represented by the following formula (10):

$$NR^{117} \qquad (10)$$

(in the above formula, $R^{117}$ is a hydrogen atom, hydroxyl group, alkyl group, cycloalkyl group, alkoxy group, aralkyl group, aralkoxy group or aryl group.),
"e'", "f'", "g'", "h'", "i'" and "j'" represent the numbers of substituents of $R^{107}$, $R^{108}$, $CR^{109}R^{110}$, $CR^{111}R^{112}$, $R^{113}$ and $R^{114}$, respectively, "e'" and "f'" are each an integer of 0 to 5, "g'" and "h'" are each an integer of 0 to 2, and "i'" and "j'" are each an integer of 0 to 4, with the proviso that when "e'", "f'", "g'", "h'", "i'" and "j'" are each not less than 2, and $R^{107}$'s, $R^{108}$'s, $CR^{109}R^{110}$'s, $CR^{111}R^{112}$'s, $R^{113}$'s, $R^{114}$'s, may be the same or different.}

The chromene compound represented by the formula (8) is preferably mixed with the chromene compound represented by the above formula (7).

$R^{107}$, $R^{108}$, $R^{113}$ and $R^{114}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, and $R^{109}$, $R^{110}$, $R^{111}$ and $R^{112}$ are each independently a hydrogen atom, hydroxyl group, alkyl group, cycloalkyl group, alkoxyl group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group. Preferred examples of these groups are the same substituents as those enumerated for $R^{102}$, $R^{103}$, $R^{104}$, $R^{105}$ and $R^{106}$ of the chromene compound represented by the formula (7).

Preferred examples of the rings formed by bonding together $R^{109}$ and $R^{110}$, $R^{111}$ and $R^{112}$, and $R^{109}$ and $R^{111}$ are the same substituents as those enumerated for $R^{105}$ and $R^{106}$ of the chromene compound represented by the formula (7).

X' is an oxygen atom, single bond or group represented by the above formula (9) or (10). Preferred examples of $R^{115}$ and $R^{116}$ in the above formula (9) are the same substituents as those enumerated for $R^{102}$, $R^{103}$, $R^{104}$, $R^{105}$ and $R^{106}$ of the chromene compound represented by the above formula (7). Preferred examples of the ring formed by bonding together $R^{115}$ and $R^{116}$ are the same substituents as those enumerated for $R^{105}$ and $R^{106}$ of the chromene compound represented by the above formula (7).

Further, preferred examples of the substituent of $R^{117}$ in the above formula (10) are the same substituents as those enumerated for $R^{102}$, $R^{103}$, $R^{104}$, $R^{105}$ and $R^{106}$ of the chromene compound represented by the above formula (7).

Out of these, the following compounds are enumerated as particularly preferred chromene compounds.

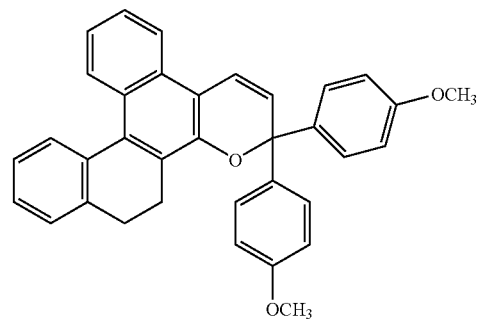

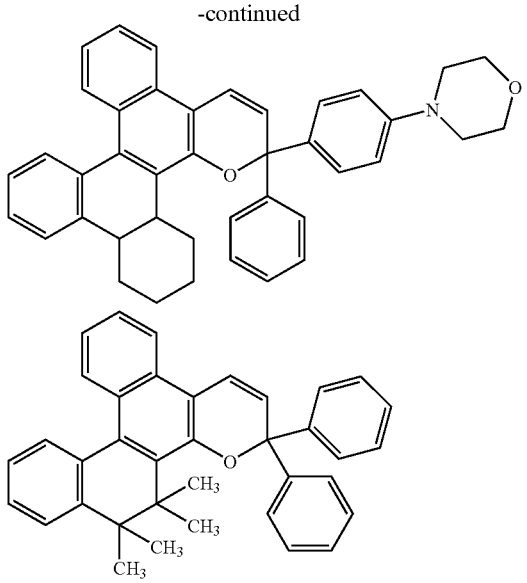

In the above photochromic compound [E], the chromene compound represented by the above formula (7) exhibits an excellent effect even when it is used alone. Therefore, the ratio of the chromene compound represented by the above formula (8) to the chromene compound represented by the above formula (7) may be adjusted according to desired color at the time of color development. The chromene compound represented by the above formula (8) is generally used in an amount of 0 to 300 parts by mass based on 100 parts by mass of the chromene compound represented by the above formula (7). When the chromene compound represented by the above formula (8) is used, it must be used in an amount of preferably 10 to 300 parts by mass, more preferably 25 to 200 parts by mass based on 100 parts by mass of the chromene compound represented by the above formula (7) in order to obtain more excellent photochromic properties. Any other photochromic compounds may be used according to purpose, besides the chromene compounds represented by the above formulas (7) and (8) according to purpose.

Photochromic Curable Composition and Other Compounding Agents

The photochromic curable composition of the present invention may be optionally mixed with stabilizers and additives such as a release agent, ultraviolet absorbent, infrared absorbent, ultraviolet stabilizer, antioxidant, coloration inhibitor, antistatic agent, fluorescent dye, dye, pigment and aroma chemical, in addition to the above polymerizable monomers and photochromic compound.

When an ultraviolet stabilizer out of these is used, the durability of the photochromic compound can be further improved advantageously. The ultraviolet stabilizer is preferably a hindered amine light stabilizer, hindered phenol antioxidant or sulfur-based antioxidant. Preferred examples of the ultraviolet stabilizer include bis(1,2,2,6,6-pentamethyl-4-piperidyl)sebacate, the Adecastab LA-52, LA-57, LA-62, LA-63, LA-67, LA-77, LA-82 and LA-87 of ADEKA CORPORATION, 2,6-di-t-butyl-4-methyl-phenol, 2,6-ethylenebis(oxyethylene)bis[3-(5-t-butyl-4-hydroxy-m-tolyl) propionate], IRGANOX 1010, 1035, 1075, 1098, 1135, 1141, 1222, 1330, 1425, 1520, 259, 3114, 3790, 5057 and 565 of Ciba Specialty Chemicals. The amount of the ultraviolet stabilizer is not particularly limited but preferably 0.001 to 10 parts by mass, more preferably 0.01 to 1 part by mass based on 100 parts by mass of the above curable composition. Particularly when a hindered amine light stabilizer is used and the amount thereof is too large, the effect of improving durability differs by each compound and a color shift may occur after deterioration. Therefore, the amount of the hindered amine light stabilizer is preferably 0.5 to 30 mols, more preferably 1 to 20 mols, much more preferably 2 to 15 mols based on 1 mol of the above photochromic compound.

Photochromic Cured Product, its Manufacturing Method and Polymerization Initiator The polymerization method for obtaining a cured product from the photochromic curable composition of the present invention is not particularly limited, and a known radical polymerization method may be employed. Polymerization initiating means is use of a radical polymerization initiator such as a peroxide or azo compound, application of ultraviolet radiation, α-ray, β-ray or γ-ray, or both of them. As a typical example of the polymerization method, cast polymerization in which the photochromic curable composition of the present invention containing a radical polymerization initiator is injected into the space between molds held by an elastomer gasket or spacer, oxidized in an air furnace and taken out is employed. Typical examples of the polymerization initiator include diacyl peroxides such as benzoyl peroxide, p-chlorobenzoyl peroxide, decanoyl peroxide, lauroyl peroxide and acetyl peroxide; peroxy esters such as t-butylperoxy-2-ethylhexanate, t-butylperoxy neodecanate, cumylperoxy neodecanate and t-butylperoxy benzoate; percarbonates such as diisopropylperoxy dicarbonate and di-sec-butylperoxy dicarbonate; and azo compounds such as azobisisobutyronitrile as thermopolymerization initiators, and acetophenone-based compounds such as 1-phenyl-2-hydroxy-2-methylpropan-1-one, 1-hydroxycyclohexylphenyl ketone and 1-(4-isopropylphenyl)-2-hydroxy-2-methylpropan-1-one; α-dicarbonyl-based compounds such as 1,2-diphenylethanedione and methylphenyl glycoxylate; and acylphosphine oxide-based compounds such as 2,6-dimethylbenzoyldiphenylphosphine oxide, 2,4,6-trimethylbenzoyldiphenylphosphine oxide, 2,4,6-trimethylbenzoyldiphenylphosphinic acid methyl ester, 2,6-dichlorobenzoyldiphenylphosphine oxide and 2,6-dimethoxybenzoyldiphenylphosphine oxide as photopolymerization initiators. These polymerization initiators may be used alone or in combination of two or more. A thermopolymerization initiator and a photopolymerization initiator may be used in combination. When a photopolymerization initiator is used, a known polymerization accelerator such as a tertiary amine may be used in combination.

In the present invention, when the above polymerization initiator is used, the amount of the polymerization initiator is preferably 0.001 to 10 parts by mass, more preferably 0.01 to 5 parts by mass based on 100 parts by mass of the total of all the polymerizable monomers.

To polymerize the photochromic curable composition of the present invention, the temperature, out of the polymerization conditions, has an influence upon the properties of the obtained photochromic cured product. Since this temperature condition which is influenced by the type and amount of the radical polymerization initiator and the types of the monomers cannot be limited completely, in general, so-called "tapered polymerization" in which polymerization is started at a relatively low temperature, the temperature is raised slowly and the composition is cured at a high temperature at the end of polymerization is preferred. Since the polymerization time differs according to various factors like the temperature, it is preferred to determine the optimum time according to these conditions. It is preferred to select conditions that ensure that the polymerization completes in 2 to 24 hours.

Characteristic Properties and Post-treatment of Photochromic Cured Product

The photochromic cured product obtained by polymerizing the photochromic curable composition of the present invention by the above method can be formed into a photochromic plastic lens which exhibits excellent storage stability, mechanical strength and photochromic properties.

Further, the photochromic cured product obtained by the above method can be subjected to the following treatment according to its application purpose. That is, it can be subjected to processing or secondary treatment such as dying with a dye such as a dispersion dye, or a hard coating agent comprising a silane coupling agent and silicon, zirconium, antimony, aluminum, tin or tungsten sol as the main component, or anti-reflection processing by the deposition of a thin film of a metal oxide such as $SiO_2$, $TiO_2$, or $ZrO_2$, or anti-reflection processing by the formation of an organic polymer thin coating film, or antistatic treatment.

EXAMPLES

The following examples are provided for the purpose of further illustrating the present invention but are in no way to be taken as limiting.

The compounds used in the following examples are given below.

(polymerizable monomers: component)
Component [A]
GMA: glycidyl methacrylate
EOGMA: 2-glycidyloxyethyl methacrylate
GA: glycidyl acrylate
Component [B]
TMPT: trimethylolpropane trimethacrylate
D-TMP: ditrimethylolpropane tetramethacrylate
A-TMMT: tetramethylolmethane tetraacrylate
Component [C]
9G: polyethylene glycol diacrylate (average chain length of ethylene glycol chains of 9, average molecular weight of 536)
A200: tetraethylene glycol diacrylate
A400: polyethylene glycol diacrylate (average chain length of ethylene glycol chains of 9, average molecular weight of 508)
APG200: tripropylene glycol diacrylate
APG400: polypropylene glycol diacrylate (average chain length of propylene glycol chains of 7, average molecular weight of 536)
APG700: polypropylene glycol diacrylate (average chain length of propylene glycol chains of 12, average molecular weight of 808)
BPE500: 2,2-bis[4-(methacryloxy.polyethoxy)phenyl]propane (average chain length of ethylene glycol chains of 10, average molecular weight of 804)
UA4200: 'UA-4200' of Shin-Nakamura Chemical Co., Ltd., bifunctional urethane (meth)acrylate (acryl equivalent of 750)
UA4400: 'UA-4400' of Shin-Nakamura Chemical Co., Ltd., bifunctional urethane (meth)acrylate (acryl equivalent of 750)
ACHD: ethoxylated cyclohexanedimethanol diacrylate (average chain length of ethylene glycol chains of 4)
APTMG: polytetramethylene glycol diacrylate (average chain length of tetramethylene glycol chains of 9)

Component [D]
3G: triethylene glycol dimethacrylate
4G: tetraethylene glycol dimethacrylate
3PG: tripropylene glycol dimethacrylate
4PG: tetrapropylene glycol dimethacrylate
U4HA: 'U-4HA' of Shin-Nakamura Chemical Co., Ltd., tetrafunctional urethane (meth)acrylate (acryl equivalent of 149, molecular weight of 596)
BPE100: 2,2-bis[4-(methacryloxyethoxy)phenyl]propane (average chain length of ethylene glycol chains of 2.6, average molecular weight of 478)
3S4G: bis(2-methacryloyloxyethylthioethyl)sulfide
3S2G: bis(2-methacryloylthioethyl)sulfide
U2PPA: 'U-2PPA' of Shin-Nakamura Chemical Co., Ltd., bifunctional urethane methacrylate (acryl equivalent of 240, molecular weight of 482)
U122P: 'U-122P' of Shin-Nakamura Chemical Co., Ltd., bifunctional urethane methacrylate (acryl equivalent of 550, molecular weight of 1,100)
EB4858: manufactured by Daicel UCB Co., Ltd., bifunctional urethane methacrylate (acryl equivalent of 227)
AMePEG(454): methyl ether polyethylene glycol acrylate having an average molecular weight of 454
MePEG: methyl ether polyethylene glycol acrylate having an average molecular weight of 468
HEMA: hydroxymethyl methacrylate
(other monomer components)
MS: α-methylstyrene
MSD: α-methylstyrene dimer
Additives
Stabilizer
HALS: bis(1,2,2,6,6-pentamethyl-4-piperidyl)sebacate (molecular weight of 508)
Dye
VioletD: violet dye (trade name: Diaresin Violet D, manufactured by Mitsubishi Chemical Corporation)
Initiator
ND: t-butylperoxy neodecanate (trade name: Perbutyl ND, manufactured by NOF Corporation)
O: 1,1,3,3-tetramethylbutyl peroxy-2-ethylhexanate (trade name: Perocta O, manufactured by NOF Corporation)
Photochromic compound [E]

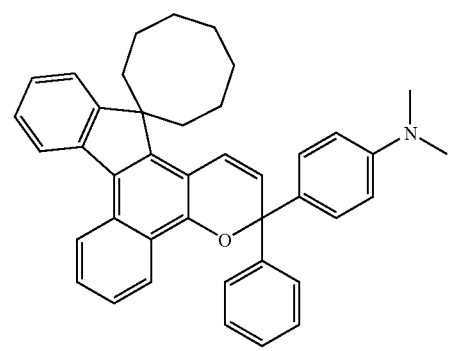

PC1

-continued

PC2
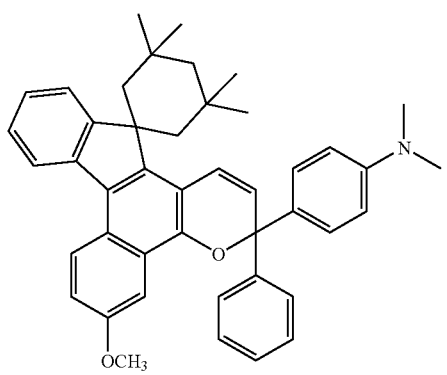

PC6
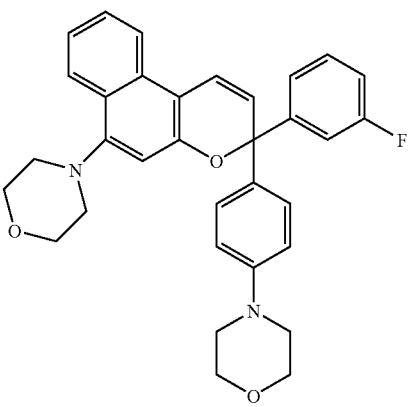

PC3
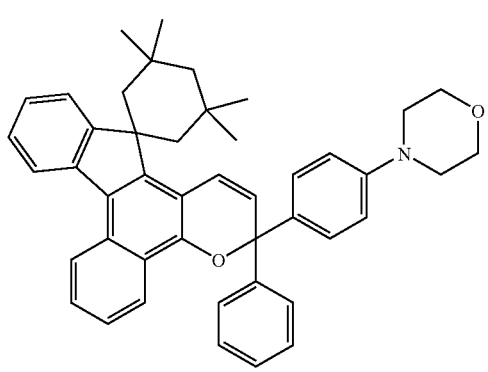

PC7
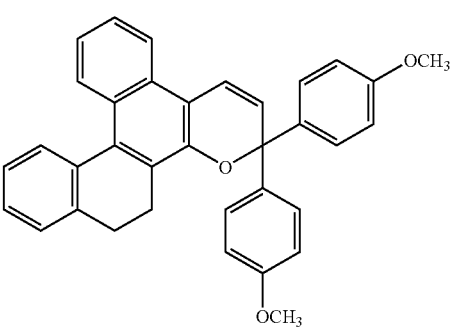

PC8
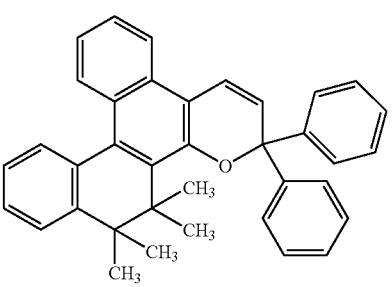

PC4
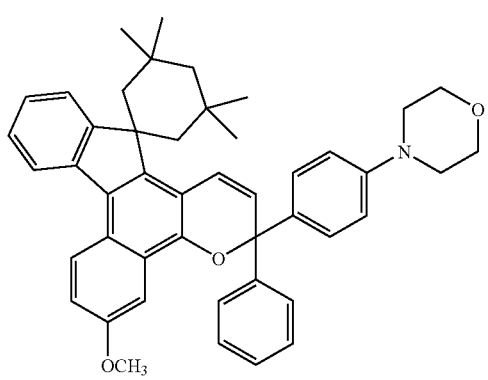

PC5
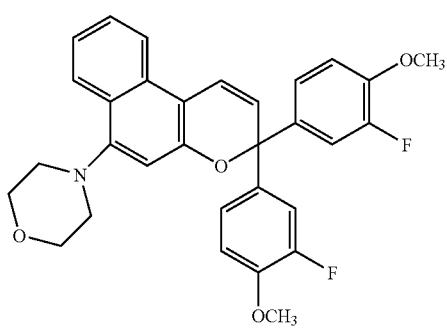

Example 1

0.04 part by mass of PC1, 0.1 part by mass of HALS, and 1 part by mass of Perbutyl ND and 0.1 part by mass of Perocta 0 as polymerization initiators were added to and fully mixed with 100 parts by mass of polymerizable monomers consisting of 1 part by mass of glycidyl methacrylate [A], 8 parts by mass of TMPT [B], 5 parts by mass of A200 [C], 32 parts by mass of 4G [D], 49 parts by mass of BPE100, 9 parts by mass of αMS and 2 parts by mass of MSD (this composition is shown in Table 1). This mixed solution was injected into a casting mold composed of a glass sheet and a gasket made of an ethylene-vinyl acetate copolymer, and substantially all the amount of the above monomer composition was polymerized by cast polymerization. Polymerization was carried out in an air furnace by gradually raising the temperature from 30 to 90° C. over 18 hours and maintaining the temperature at 90° C. for 2 hours. After the end of polymerization, the obtained cured product was taken out from the glass mold.

The obtained photochromic cured product (thickness of 2 mm) was used as a sample and irradiated with a beam having an intensity on the surface of the polymer of 2.4 mW/cm² at a wavelength of 365 nm and 24 μW/cm² at 245 nm from the L-2480 (300 W) SHL-100 xenon lamp of Hamamatsu Photonics K.K. through an aeromass filter (manufactured by Corning Inc.) at 20° C.±1° C. for 120 seconds to develop a color so as to measure its photochromic properties. The photochromic properties were evaluated by the following methods and shown in Table 7.

1) Maximum absorption wavelength (λmax): maximum absorption wavelength after color development obtained by the spectrophotometer (instantaneous multi-channel photodetector MCPD1000) of Ohtsuka Electronics Co., Ltd. The maximum absorption wavelength is connected with color at the time of color development.
2) Initial coloration (Abs.): absorbance $\epsilon(0)$ at the maximum absorption wavelength when the photochromic cured product is not irradiated. When the absorbance $\epsilon(0)$ is 0.02, coloration can be confirmed visually and when the absorbance $\epsilon(0)$ is not less than 0.04, great coloration can be apparently confirmed visually.
3) Color optical density $\{\epsilon(120)-\epsilon(0)\}$: difference between absorbance $\{\epsilon(120)\}$ after 120 seconds of irradiation at the above maximum absorption wavelength and the above absorbance $\epsilon(0)$. It can be said that as this value becomes larger, photochromic properties become more excellent. The color which was developed outdoors was evaluated visually.
4) Fading speed [t½(sec.)]: time elapsed until the absorbance at the above maximum wavelength of the sample drops to ½ of $\{\epsilon(120)-\epsilon(0)\}$ when irradiation is continued for 120 seconds and then stopped. It can be said that as the time becomes shorter, photochromic properties become more excellent.
5) Durability (%)=$\{(A200/A0)\times 100\}$: The following deterioration promotion test was carried out to evaluate the durability of color developed by exposure. That is, the deterioration of the obtained polymer (sample) was promoted for 200 hours by the X25 xenon weather meter of Suga Test Instruments Co., Ltd. Thereafter, the color optical density was evaluated before and after the test, and the color optical density (A0) before the test and the color optical density (A200) after the test were measured to calculate $\{(A200/A0)\times 100\}$ as the residual rate (%) which is an index for the durability of the developed color. As the residual rate becomes higher, the durability of the developed color becomes higher.

Further, the characteristic properties of the base material were evaluated for the following items. The obtained results are shown in Table 7.

6) Lens storage stability 1 (coloration at the time of non-exposure) $\Delta b^*$: The above photochromic cured product was stored in a thermo-hygrostat at 60° C. and 90% for one week as a storage stability promotion test to measure its change at the time of non-exposure. As for the measurement method, the spectrum of the above $\epsilon(0)$ was changed into the L*a*b* color specification system based on JIS (JISZ8729), and the change of b* indicative of yellowness was expressed as $\Delta b^*=b^*$ (after 1 week)$-b^*$ (initial). As $\Delta b^*$ rises, the photochromic cured product becomes more yellow. It is understood that when $\Delta b^*$ is not less than 0.5, the photochromic cured product becomes apparently yellow. It is assumed that this test corresponds to 1 year of actual storage.
7) Lens storage stability 2 (redness at the time of color development) $\Delta a^*$: The above photochromic cured product was stored in a thermo-hygrostat at 60° C. and 90% for one week as a storage stability promotion test to measure its change at the time of color development. As for the measurement method, the spectrum of the above $\epsilon(120)$ was changed into the L*a*b* color specification system based on JIS (JISZ8729), and the change of a* indicative of yellowness was expressed as $\Delta a^*=a^*$ (after 1 week)$-a^*$ (initial). As $\Delta a^*$ rises, the photochromic cured product becomes more red. It is understood that when $\Delta a^*$ is not less than 1, the photochromic cured product becomes apparently red. It is assumed that this test corresponds to 1 year of actual storage.
8) L-scale Rockwell hardness (HL): After the above cured product was kept in a room at 25° C. for one day, its L-scale Rockwell hardness was measured with the Rockwell hardness meter (type: AR-10) of Akashi Co., Ltd.
9) Tensile strength (kgf): A disk-like sample having a thickness of 2 mm and a diameter of 5 cm was formed from the obtained cured product, two holes having a diameter of 2 mm were drilled in the disk-like sample at positions 4 mm from the periphery of the sample on the same line as the diameter of the sample as the center points thereof, stainless steel rods having a diameter of 1.6 mm were inserted into the two respective holes and fixed to the upper and lower chucks of a tensile tester while they penetrated the sample to carry out a tensile test at a speed of 5 mm/min so as to measure the tensile strength of the sample. When the tensile strength was evaluated with typical CR-39 used for eyeglass lenses, it was 18 kgf. When it was less than 12 kgf, the sample had a problem with strength as an eyeglass lens.
10) Optical distortion: The optical distortion of the molded cured product was observed under an orthogonal Nicole. ○ indicates that there is no optical distortion and X indicates that there is an optical distortion.
11) Refractive index: The refractive index was measured at 20° C. with the refractometer of Atago Co., Ltd. Bromonaphthalene or methylene iodide was used as a contact solution to measure the refractive index at a D-ray.

Examples 2 to 40 and Comparative Examples 1 to 12

The procedure of Example 1 was repeated except that the photochromic compositions shown in Tables 1, 2, 3, 4, 5 and 6 were used to produce photochromic cured products and evaluate them. The results are shown in Tables 7, 8, 9, 10 and 11.

TABLE 1

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 1 | GMA(1) | TMPT(8) | A200(5) BPE500(5) | BPE100(49) 4G(32) | PC1(0.04) | MS(9) MSD(2) | HALS(0.1) | ND(1) O(0.1) |
| 2 | GMA(3) | TMPT(8) | A200(5) BPE500(5) | BPE100(49) 4G(30) | PC1(0.04) | MS(9) MSD(2) | HALS(0.1) | ND(1) O(0.1) |
| 3 | GMA(4) | TMPT(8) | A200(5) BPE500(5) | BPE100(49) 4G(29) | PC1(0.04) | MS(9) MSD(2) | HALS(0.1) | ND(1) O(0.1) |

TABLE 1-continued

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 4 | GMA(1) | TMPT(15) | A200(5) BPE500(5) | BPE100(49) 4G(25) | PC1(0.04) | MS(9) MSD(2) | HALS(0.1) | ND(1) |
| 5 | GMA(1) | TMPT(15) | A200(20) BPE500(10) | BPE100(49) 4G(5) | PC1(0.04) | MS(9) MSD(2) | HALS(0.1) | ND(1) |
| 6 | GMA(1) | TMPT(8) | A200(5) BPE500(10) | BPE100(34) 4G(42) | PC1(0.04) | MS(6) MSD(2) | HALS(0.1) | ND(1) O(0.1) |
| 7 | GMA(1) | TMPT(8) | A200(5) BPE500(5) | BPE100(23) 4G(58) | PC1(0.04) | MS(8) MSD(2) | HALS(0.1) | ND(1) O(0.1) |
| 8 | GMA(1) | TMPT(8) | A200(5) BPE500(5) | BPE100(49) 3S4G(32) | PC1(0.04) | MS(9) MSD(2) | HALS(0.1) | ND(1) O(0.1) |
| 9 | GMA(1) | TMPT(9) | A400(10) BPE500(10) | 3S2G(70) | PC1(0.04) | MS(9) MSD(2) | HALS(0.1) | ND(1) |
| 10 | GMA(1) | TMPT(8) | A400(5) BPE500(5) | BPE100(49) 4G(32) | PC4(0.04) | MS(9) MSD(2) | HALS(0.1) | ND(1) O(0.1) |

TABLE 2

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 11 | GMA(1) | TMPT(6) | A400(6) | 4G(48) 3PG(39) | PC4(0.04) | MSD(1) | HALS(0.1) | ND(1) |
| 12 | GMA(1) | TMPT(6) | A400(6) | 4G(48) 4PG(39) | PC4(0.04) | MSD(1) | HALS(0.1) | ND(1) |
| 13 | GMA(1) | TMPT(6) | APG700(9) | 4G(32) 4PG(39) U122P(13) | PC4(0.04) | MSD(1) | HALS(0.1) | ND(1) O(0.1) |
| 14 | GMA(1) | TMPT(15) | 9G(11) | 4G(21) 4PG(39) U122P(13) | PC4(0.04) | MSD(2) | HALS(0.1) | ND(1) |
| 15 | GMA(1) | TMPT(6) | APG200(15) | 4PG(39) U122P(39) | PC4(0.04) | MSD(2) | HALS(0.1) | ND(1) |
| 16 | GMA(1) | TMPT(5) | A200(5) BPE500(10) | 4G(44) 4PG(35) | PC4(0.04) | MSD(2) | HALS(0.1) | ND(1) |
| 17 | GMA(1) | TMPT(6) | A200(6) | 4G(31) 4PG(39) U2PPA(17) | PC4(0.04) | MSD(1) | HALS(0.1) | ND(1) |
| 18 | GMA(1) | TMPT(6) | A200(6) UA4400(8) | 4G(32) 4PG(39) U2PPA(8) | PC4(0.04) | MSD(1) | HALS(0.1) | ND(1) |
| 19 | GMA(1) | TMPT(5) | ACHD(15) UA4200(10) | 3PG(39) U2PPA(30) | PC4(0.04) | MSD(1) | HALS(0.1) | ND(1) |
| 20 | GMA(1) | TMPT(5) | APTMG(15) | 3PG(39) U2PPA(40) | PC4(0.04) | MSD(1) | HALS(0.1) | ND(1) |
| 21 | GMA(1) | TMPT(6) | APTMG(11) | 3PG(66) U2PPA(16) | PC4(0.04) | MS(9) MSD(2) | HALS(0.1) | ND(1) |
| 22 | GMA(1) | TMPT(6) | A200(6) UA4200(11) | 3PG(65) U2PPA(11) | PC4(0.04) | MS(9) MSD(2) | HALS(0.1) | ND(1) |

TABLE 3

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 23 | GMA(1) | TMPT(8) | A400(5) BPE500(5) | BPE100(49) 4G(32) | PC1(0.03) PC5(0.02) PC6(0.005) | MS(9) MSD(2) | HALS(0.1) | ND(1) O(0.1) |
| 24 | GMA(1) | TMPT(8) | A400(5) BPE500(5) | BPE100(49) 4G(32) | PC1(0.025) PC5(0.025) PC6(0.03) | MS(9) MSD(2) | HALS(0.1) | ND(1) O(0.1) |
| 25 | GMA(1) | TMPT(8) | A400(5) BPE500(5) | BPE100(49) 4G(32) | PC2(0.005) PC3(0.02) PC4(0.025) PC5(0.015) | MS(9) MSD(2) | HALS(0.1) VioletD (0.00004) | ND(1) O(0.1) |

TABLE 3-continued

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 26 | GMA(1) | TMPT(8) | A400(5) BPE500(5) | BPE100(49) 4G(32) | PC3(0.025) PC4(0.015) PC5(0.02) PC6(0.01) | MS(9) MSD(2) | HALS(0.1) VioletD (0.00005) | ND(1) O(0.1) |
| 27 | GMA(1) | TMPT(8) | A400(5) BPE500(5) | BPE100(49) 4G(32) | PC2(0.005) PC3(0.02) PC4(0.025) PC7(0.015) | MS(9) MSD(2) | HALS(0.1) | ND(1) O(0.1) |

TABLE 4

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 28 | GMA(1) | TMPT(6) | APTMG(11) | 3PG(66) U2PPA(16) | PC1(0.03) PC5(0.02) PC6(0.005) | MS(9) MSD(2) | HALS(0.1) | ND(1) O(0.1) |
| 29 | GMA(1) | TMPT(6) | APTMG(11) | 3PG(66) U2PPA(16) | PC1(0.025) PC5(0.025) PC6(0.03) | MS(9) MSD(2) | HALS(0.1) | ND(1) O(0.1) |
| 30 | GMA(1) | TMPT(6) | APTMG(11) | 3PG(66) U2PPA(16) | PC2(0.01) PC3(0.015) PC4(0.025) PC5(0.015) | MS(9) MSD(2) | HALS(0.1) VioletD (0.00004) | ND(1) O(0.1) |
| 31 | GMA(0.5) | TMPT(6.5) | APTMG(11) | 3PG(66) U2PPA(16) | PC2(0.005) PC3(0.015) PC4(0.015) PC5(0.02) PC6(0.01) | MS(9) MSD(2) | HALS(0.1) VioletD (0.00005) | ND(1) O(0.1) |
| 32 | GMA(1) | TMPT(6) | APTMG(11) | 3PG(66) U2PPA(16) | PC2(0.001) PC3(0.015) PC4(0.025) PC7(0.015) | MS(9) MSD(2) | HALS(0.1) | ND(1) O(0.1) |

TABLE 5

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 33 | GMA(1) | TMPT(10) | A400(15) | 3PG(49) EB4858(25) | PC3(0.01) PC4(0.025) PC7(0.045) | MSD(2) | HALS(0.1) | ND(1) O(0.1) |
| 34 | GMA(1) | TMPT(10) | A400(15) | 3PG(44) EB4858(30) MePEG(5) | PC2(0.005) PC3(0.02) PC4(0.025) PC7(0.015) | MSD(2) | HALS(0.1) | ND(1) O(0.1) |
| 35 | GMA(1) | TMPT(8) | A200(20) BPE500(5) | BPE100(20) 4G(46) | PC2(0.005) PC3(0.02) PC4(0.025) PC8(0.02) | MS(9) MSD(2) | HALS(0.1) | ND(1) O(0.1) |
| 36 | EOGMA(3) | TMPT(8) | A400(20) | 3PG(39) U2PPA(30) | PC2(0.005) PC3(0.02) PC4(0.025) PC8(0.02) | MS(9) MSD(2) | HALS(0.1) | ND(1) O(0.1) |
| 37 | GA(2) | TMPT(8) | A400(20) | 3PG(40) EB4858(30) | PC2(0.005) PC3(0.02) PC4(0.025) PC7(0.015) | MS(9) MSD(2) | HALS(0.1) | ND(1) O(0.1) |

TABLE 5-continued

| Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 38 | GMA(2) | D-TMP(8) | A400(20) | 3PG(40) EB4858(30) | PC2(0.005) PC3(0.02) PC4(0.025) PC7(0.015) | MSD(2) | HALS(0.1) | ND(1) O(0.1) |
| 39 | GMA(1) | A-TMMT(10) | A200(25) | 4PG(34) U2PPA(30) | PC2(0.005) PC3(0.02) PC4(0.025) PC7(0.015) | MSD(3) | HALS(0.1) | ND(1) O(0.1) |
| 40 | EOGMA(2) | D-TMP(8) | A200(10) BPE500(10) | BPE100(45) 4G(25) | PC2(0.005) PC3(0.02) PC4(0.025) PC7(0.015) | MS(9) MSD(2) | HALS(0.1) | ND(1) O(0.1) |

TABLE 6

| Comparative Example No. | [A] (parts by mass) | [B] (parts by mass) | [C] (parts by mass) | [D] (parts by mass) | [E] (parts by mass) | Other monomer (parts by mass) | Additive (parts by mass) | Initiator (parts by mass) |
|---|---|---|---|---|---|---|---|---|
| 1 | GMA(9) | TMPT(8) | A200(5) BPE500(5) | BPE100(49) 4G(24) | PC1(0.04) | MS(9) MSD(2) | HALS(0.1) | ND(1) O(0.1) |
| 2 | GMA(9) | TMPT(32) | A200(5) BPE500(5) | BPE100(49) 4G(24) | PC1(0.04) | MS(9) MSD(2) | HALS(0.1) | ND(1) O(0.1) |
| 3 | GMA(5) | TMPT(37) | 9G(58) | HEMA(4) | PC1(0.04) | MSD(1) | HALS(0.1) | ND(1) O(0.1) |
| 4 | GMA(5) | TMPT(65) | — | 3PG(30) | PC1(0.04) | MS(4) MSD(1) | HALS(0.1) | ND(1) O(0.1) |
| 5 | GMA(1) | TMPT(8) | A200(42) | BPE100(49) | PC1(0.04) | MS(9) MSD(1) | HALS(0.1) | ND(1) O(0.1) |
| 6 | GMA(1) | — | — | 4PG(50) 3G(49) | PC1(0.04) | MS(9) MSD(1) | HALS(0.1) | ND(1) O(0.1) |
| 7 | GMA(1) | — | — | 3G(80) 4G(19) | PC1(0.04) | — | HALS(0.1) | ND(1) O(0.1) |
| 8 | GMA(9) | TMPT(8) | A400(5) BPE500(5) | BPE100(49) 4G(24) | PC1(0.03) PC5(0.02) PC6(0.005) | MS(9) MSD(2) | HALS(0.1) | ND(1) O(0.1) |
| 9 | GMA(9) | TMPT(8) | A400(5) BPE500(5) | BPE100(49) 4G(24) | PC2(0.005) PC3(0.02) PC4(0.025) PC5(0.015) | MS(9) MSD(2) | HALS(1) VioletD (0.00004) | ND(1) O(0.1) |
| 10 | GMA(9) | TMPT(8) | A400(5) BPE500(5) | BPE100(49) 4G(24) | PC2(0.005) PC3(0.02) PC4(0.025) PC7(0.015) | MS(9) MSD(2) | HALS(0.1) | ND(1) O(0.1) |
| 11 | GMA(0.03) | TMPT(8) | A200(5) BPE500(5) | BPE100(57.97) 4G(24) | PC2(0.005) PC3(0.02) PC4(0.025) PC7(0.015) | MS(9) MSD(2) | HALS(1) VioletD (0.00004) | ND(1) O(0.1) |
| 12 | GMA(1) | TMPT(8) | — | AMePEG(18) BPE100(49) 4G(42) | PC2(0.005) PC3(0.02) PC4(0.025) PC7(0.015) | MS(9) MSD(2) | HALS(1) VioletD (0.00004) | ND(1) O(0.1) |

TABLE 7

| Example No. | Maximum absorption wavelength ($\lambda$max) | Initial coloration (Abs.) | Color optical density (Abs.) | Developed color | Fading speed (seconds) | Durability (%) | Storage stability 1 of lens (coloration at the time of non-exposure) $\Delta$b* |
|---|---|---|---|---|---|---|---|
| 1 | 588 nm | 0.04 | 1.17 | Blue | 73 | 90 | 0 |
| 2 | 588 nm | 0.04 | 1.1 | Blue | 80 | 90 | 0.1 |
| 3 | 588 nm | 0.04 | 1.09 | Blue | 90 | 90 | 0.2 |
| 4 | 588 nm | 0.04 | 1.31 | Blue | 66 | 88 | 0.1 |
| 5 | 586 nm | 0.04 | 1.28 | Blue | 60 | 87 | 0.1 |
| 6 | 586 nm | 0.04 | 1.21 | Blue | 70 | 91 | 0.1 |
| 7 | 586 nm | 0.04 | 1.21 | Blue | 70 | 92 | 0.1 |
| 8 | 590 nm | 0.04 | 1.15 | Blue | 76 | 88 | 0.1 |

TABLE 7-continued

| | | | | | | | |
|---|---|---|---|---|---|---|---|
| 9 | 592 nm | 0.04 | 1.11 | Blue | 80 | 86 | 0.1 |
| 10 | 579 nm | 0.01 | 0.86 | Bluish purple | 65 | 94 | 0 |

| Example No. | Storage stability 2 of lens (redness at the time of color development) Δa* | L-scale Rockwell hardness (HL) | Tensile strength (kgf) | Optical distortion | Refractive index |
|---|---|---|---|---|---|
| 1 | 0.1 | 94 | 32 | ○ | 1.545 |
| 2 | 0.2 | 90 | 30 | ○ | 1.545 |
| 3 | 0.4 | 90 | 30 | ○ | 1.545 |
| 4 | 0.1 | 95 | 21 | ○ | 1.545 |
| 5 | 0.1 | 88 | 19 | ○ | 1.545 |
| 6 | 0.2 | 89 | 28 | ○ | 1.535 |
| 7 | 0.1 | 93 | 31 | ○ | 1.525 |
| 8 | 0.2 | 96 | 28 | ○ | 1.563 |
| 9 | 0.1 | 96 | 26 | ○ | 1.581 |
| 10 | 0 | 94 | 32 | ○ | 1.545 |

TABLE 8

| Example No. | Maximum absorption wavelength (λmax) | Initial coloration (Abs.) | Color optical density (Abs.) | Developed color | Fading speed (seconds) | Durability (%) | Storage stability 1 of lens (coloration at the time of non-exposure) Δb* |
|---|---|---|---|---|---|---|---|
| 11 | 573 nm | 0.01 | 0.69 | Bluish purple | 95 | 93 | 0 |
| 12 | 576 nm | 0.01 | 0.79 | Bluish purple | 76 | 94 | 0 |
| 13 | 574 nm | 0.01 | 0.9 | Bluish purple | 76 | 86 | 0 |
| 14 | 574 nm | 0.01 | 0.77 | Bluish purple | 78 | 90 | 0 |
| 15 | 576 nm | 0.01 | 0.75 | Bluish purple | 92 | 94 | 0 |
| 16 | 577 nm | 0.01 | 0.97 | Bluish purple | 45 | 90 | 0.1 |
| 17 | 576 nm | 0.01 | 0.69 | Bluish purple | 69 | 94 | 0 |
| 18 | 574 nm | 0.01 | 0.77 | Bluish purple | 48 | 88 | 0 |
| 19 | 576 nm | 0.01 | 0.82 | Bluish purple | 70 | 90 | 0 |
| 20 | 574 nm | 0.01 | 0.93 | Bluish purple | 64 | 90 | 0 |
| 21 | 573 nm | 0.01 | 0.74 | Bluish purple | 53 | 92 | 0 |
| 22 | 576 nm | 0.01 | 0.72 | Bluish purple | 65 | 88 | 0 |

| Example No. | Storage stability 2 of lens (redness at the time of color development) Δa* | L-scale Rockwell hardness (HL) | Tensile strength (kgf) | Optical distortion | Refractive index |
|---|---|---|---|---|---|
| 11 | 0 | 101 | 16 | ○ | 1.501 |
| 12 | 0.1 | 94 | 17 | ○ | 1.500 |
| 13 | 0 | 78 | 22 | ○ | 1.500 |
| 14 | 0.1 | 90 | 16 | ○ | 1.501 |
| 15 | 0 | 90 | 30 | ○ | 1.499 |
| 16 | 0.1 | 70 | 16 | ○ | 1.505 |
| 17 | 0 | 93 | 23 | ○ | 1.501 |
| 18 | 0 | 81 | 18 | ○ | 1.502 |
| 19 | 0.1 | 80 | 24 | ○ | 1.502 |
| 20 | 0.1 | 89 | 28 | ○ | 1.501 |
| 21 | 0.1 | 86 | 21 | ○ | 1.504 |
| 22 | 0.1 | 87 | 20 | ○ | 1.504 |

TABLE 9

| Example No. | Maximum absorption wavelength (λmax) | Initial coloration (Abs.) | Color optical density (Abs.) | Developed color | Fading speed (seconds) | Durability (%) | Storage stability 1 of lens (coloration at the time of non-exposure) Δb* |
|---|---|---|---|---|---|---|---|
| 23 | 474 nm | 0.04 | 0.54 | Gray | 75 | 87 | 0.2 |
|  | 588 nm | 0.04 | 0.71 |  | 77 | 95 |  |
| 24 | 472 nm | 0.04 | 0.73 | Brown | 77 | 88 | 0.2 |
|  | 563 nm | 0.03 | 0.61 |  | 80 | 93 |  |
| 25 | 453 nm | 0.02 | 0.55 | Gray | 66 | 91 | 0.1 |
|  | 574 nm | 0.02 | 0.73 |  | 62 | 100 |  |
| 26 | 452 nm | 0.02 | 0.74 | Brown | 59 | 88 | 0 |
|  | 564 nm | 0.02 | 0.63 |  | 56 | 93 |  |
| 27 | 464 nm | 0.005 | 0.53 | Gray | 75 | 91 | 0 |
|  | 574 nm | 0.02 | 0.73 |  | 62 | 100 |  |
| 28 | 474 nm | 0.04 | 0.54 | Gray | 70 | 88 | 0.2 |
|  | 582 nm | 0.04 | 0.72 |  | 72 | 95 |  |
| 29 | 472 nm | 0.04 | 0.76 | Brown | 73 | 85 | 0.2 |
|  | 560 nm | 0.03 | 0.63 |  | 75 | 90 |  |
| 30 | 453 nm | 0.02 | 0.56 | Gray | 58 | 90 | 0.1 |
|  | 572 nm | 0.02 | 0.74 |  | 53 | 99 |  |
| 31 | 450 nm | 0.02 | 0.74 | Brown | 60 | 88 | 0 |
|  | 562 nm | 0.02 | 0.61 |  | 58 | 93 |  |
| 32 | 464 nm | 0.005 | 0.53 | Gray | 73 | 91 | 0 |
|  | 574 nm | 0.02 | 0.74 |  | 55 | 100 |  |

| Example No. | storage stability 2 of lens (redness at the time of color development) Δa* | L-scale Rockwell hardness (HL) | Tensile strength (kgf) | Optical distortion | Refractive index |
|---|---|---|---|---|---|
| 23 | 0.1 | 94 | 32 | ○ | 1.545 |
| 24 | 0.1 | 94 | 32 | ○ | 1.545 |
| 25 | 0.1 | 94 | 32 | ○ | 1.545 |
| 26 | 0.1 | 94 | 32 | ○ | 1.545 |
| 27 | 0.1 | 94 | 32 | ○ | 1.545 |
| 28 | 0.1 | 86 | 22 | ○ | 1.504 |
| 29 | 0.1 | 86 | 22 | ○ | 1.504 |
| 30 | 0.1 | 86 | 22 | ○ | 1.504 |
| 31 | 0.1 | 86 | 22 | ○ | 1.504 |
| 32 | 0.1 | 86 | 22 | ○ | 1.504 |

TABLE 10

| Example No. | Maximum absorption wavelength (λmax) | Initial coloration (Abs.) | Color optical density (Abs.) | Developed color | Fading speed (seconds) | Durability (%) | Storage stability 1 of lens (coloration at the time of non-exposure) Δb* |
|---|---|---|---|---|---|---|---|
| 33 | 464 nm | 0.01 | 0.69 | Brown | 64 | 90 | 0.1 |
|  | 570 nm | 0.02 | 0.55 |  | 62 | 98 |  |
| 34 | 460 nm | 0.005 | 0.51 | Gray | 62 | 88 | 0.1 |
|  | 572 nm | 0.02 | 0.68 |  | 60 | 97 |  |
| 35 | 455 nm | 0.005 | 0.55 | Gray | 63 | 91 | 0.1 |
|  | 572 nm | 0.02 | 0.73 |  | 70 | 100 |  |
| 36 | 458 nm | 0.005 | 0.51 | Gray | 57 | 90 | 0 |
|  | 570 nm | 0.02 | 0.68 |  | 59 | 95 |  |
| 37 | 460 nm | 0.005 | 0.53 | Gray | 64 | 91 | 0 |
|  | 570 nm | 0.02 | 0.73 |  | 62 | 100 |  |
| 38 | 460 nm | 0.005 | 0.54 | Gray | 70 | 89 | 0.1 |
|  | 570 nm | 0.02 | 0.72 |  | 68 | 95 |  |
| 39 | 460 nm | 0.005 | 0.53 | Gray | 64 | 89 | 0.1 |
|  | 570 nm | 0.02 | 0.70 |  | 62 | 97 |  |

TABLE 10-continued

| | | | | | | | |
|---|---|---|---|---|---|---|---|
| 40 | 464 nm | 0.005 | 0.53 | Gray | 70 | 90 | 0.1 |
| | 574 nm | 0.02 | 0.73 | | 68 | 99 | |

| Example No. | storage stability 2 of lens (redness at the time of color development) Δa* | L-scale Rockwell hardness (HL) | Tensile strength (kgf) | Optical distortion | Refractive index |
|---|---|---|---|---|---|
| 33 | 0.1 | 84 | 22 | ○ | 1.500 |
| 34 | 0.1 | 80 | 22 | ○ | 1.501 |
| 35 | 0.1 | 94 | 26 | ○ | 1.529 |
| 36 | 0.1 | 81 | 22 | ○ | 1.505 |
| 37 | 0.1 | 84 | 22 | ○ | 1.501 |
| 38 | 0.1 | 90 | 22 | ○ | 1.500 |
| 39 | 0.1 | 84 | 22 | ○ | 1.500 |
| 40 | 0.1 | 94 | 32 | ○ | 1.545 |

TABLE 11

| Comparative Example No. | Maximum absorption wavelength (λmax) | Initial coloration (Abs.) | Color optical density (Abs.) | Developed color | Fading speed (seconds) | Durability (%) | Storage stability 1 of lens (coloration at the time of non-exposure) Δb* |
|---|---|---|---|---|---|---|---|
| 1 | 588 nm | 0.04 | 1.22 | Blue | 110 | 85 | 0.7 |
| 2 | 588 nm | 0.04 | 1.44 | Blue | 70 | 83 | 0.7 |
| 3 | 580 nm | 0.04 | 1.33 | Blue | 45 | 60 | 0.3 |
| 4 | 578 nm | 0.04 | 1.38 | Blue | 55 | 65 | 0.3 |
| 5 | 586 nm | 0.05 | 1.38 | Blue | 45 | 77 | 0.1 |
| 6 | 580 nm | 0.05 | 0.55 | Blue | 210 | 90 | 0.1 |
| 7 | 580 nm | 0.04 | 0.45 | Blue | 183 | 90 | 0.1 |
| 8 | 474 nm | 0.04 | 0.50 | Gray | 100 | 80 | 1.1 |
| | 588 nm | 0.04 | 0.71 | | 125 | 90 | |
| 9 | 453 nm | 0.02 | 0.56 | Gray | 108 | 70 | 0.5 |
| | 574 nm | 0.02 | 0.74 | | 113 | 92 | |
| 10 | 464 nm | 0.005 | 0.5 | Gray | 130 | 85 | 0.2 |
| | 574 nm | 0.02 | 0.71 | | 110 | 95 | |
| 11 | 464 nm | 0.02 | 0.55 | Gray | 66 | 58 | 0.1 |
| | 574 nm | 0.02 | 0.73 | | 62 | 65 | |
| 12 | 464 nm | 0.02 | 0.47 | Gray | 59 | 59 | 0.1 |
| | 574 nm | 0.02 | 0.61 | | 56 | 67 | |

| Comparative Example No. | Storage stability 2 of lens (redness at the time of color development) Δa* | L-scale Rockwell hardness (HL) | Tensile strength (kgf) | Optical distortion | Refractive index |
|---|---|---|---|---|---|
| 1 | 2.5 | 94 | 32 | ○ | 1.545 |
| 2 | 2.8 | 110 | 8 | ○ | 1.545 |
| 3 | 0.4 | 97 | 6 | X | 1.495 |
| 4 | 0.4 | 100 | 6 | X | 1.513 |
| 5 | 0.2 | 66 | 18 | X | 1.543 |
| 6 | 0.1 | 100 | 16 | ○ | 1.500 |
| 7 | 0.1 | 94 | 20 | X | 1.515 |
| 8 | 3.3 | 96 | 32 | ○ | 1.545 |
| 9 | 1.3 | 96 | 32 | ○ | 1.545 |
| 10 | 1.0 | 96 | 32 | ○ | 1.545 |
| 11 | 0.1 | 97 | 32 | ○ | 1.545 |
| 12 | 0.2 | 58 | 21 | X | 1.545 |

EFFECT OF THE INVENTION

The cured product obtained by polymerizing the photochromic curable composition of the present invention is excellent in not only photochromic properties but also mechanical and optical properties. Therefore, the cured product obtained by polymerizing the photochromic curable composition of the present invention is useful as an organic glass having photochromic properties and can be advantageously used for applications such as photochromic plastic lenses. The obtained cured product, for example, photochromic plastic lens has excellent long-term storage stability and is very useful.

The invention claimed is:

1. A photochromic curable composition comprising:

[A] not less than 0.1 part and less than 5.0 parts by mass of a radically polymerizable monomer having an epoxy group represented by the following formula (1):

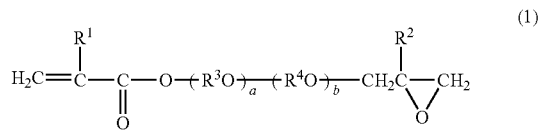
(1)

wherein $R^1$ and $R^2$ are each independently a hydrogen atom or methyl group, $R^3$ and $R^4$ are each independently an alkylene group having 1 to 4 carbon atoms which may be substituted by a hydroxyl group, or group represented by the formula

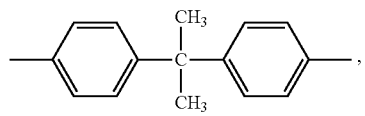

and "a" and "b" are each a number of 0 to 20 as an average value;

[B] 1.0 to 15.0 parts by mass of a polyfunctional radically polymerizable monomer represented by the following formula (2):

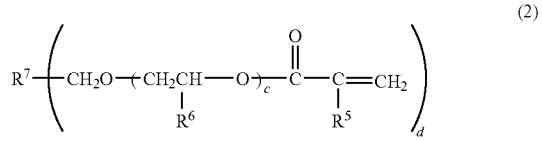
(2)

wherein $R^5$ and $R^6$ are each independently a hydrogen atom or alkyl group having 1 to 2 carbon atoms, $R^7$ is a trivalent to hexavalent organic group having 1 to 10 carbon atoms, "c" is a number of 0 to 3 as an average value, and "d" is an integer of 3 to 6;

[C] 1.0 to 30.0 parts by mass of at least one di(meth)acrylate monomer selected from the group consisting of a di(meth)acrylate monomer represented by the following formula (3), di(meth)acrylate monomer represented by the following formula (4) and urethane di(meth)acrylate monomer having a (meth)acryl equivalent of not less than 600:

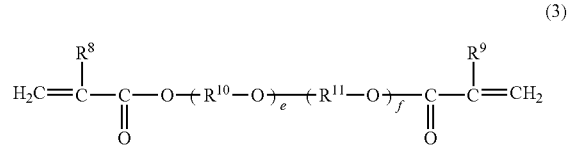
(3)

wherein $R^8$ and $R^9$ are each independently a hydrogen atom or methyl group, $R^{10}$ and $R^{11}$ are each independently a linear or branched alkylene group having 2 to 4 carbon atoms, and "e" and "f" are each an integer including "0", with the proviso that when $R^8$ and $R^9$ are both methyl groups, (e+f) is not less than 7 and less than 15 as an average value, when $R^8$ is a methyl group and $R^9$ is a hydrogen atom, (e+f) is not less than 5 and less than 15 as an average value, and when $R^8$ and $R^9$ are both hydrogen atoms, (e+f) is not less than 3 and less than 15 as an average value,

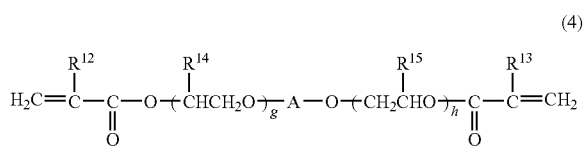
(4)

wherein $R^{12}$ and $R^{13}$ are each independently a hydrogen atom or methyl group, $R^{14}$ and $R^{15}$ are each independently a hydrogen atom or methyl group, "A" is a divalent organic group having 1 to 20 carbon atoms, and "g" and "h" are each an integer of not less than 1, with the proviso that when $R^{12}$ and $R^{13}$ are both methyl groups, (g+h) is not less than 7 and less than 15 as an average value, when $R^{12}$ is a methyl group and $R^{13}$ is a hydrogen atom, (g+h) is not less than 5 and less than 15 as an average value, and when $R^{12}$ and $R^{13}$ are both hydrogen atoms, (g+h) is not less than 3 and less than 15 as an average value;

[D] more than 50.0 parts and not more than 97.9 parts by mass of a (meth)acrylate monomer except the above components [A] to [C] and/or a thio(meth)acrylate monomer, wherein the total amount of the components [A], [B], [C] and [D] is 100 parts by mass; and

[E] 0.001 to 10 parts by mass of a photochromic compound based on 100 parts by mass of the total of all the polymerizable monomers.

2. The photochromic curable composition according to claim 1, wherein the component [D] contains a (meth)acrylate monomer represented by the following formula (6):

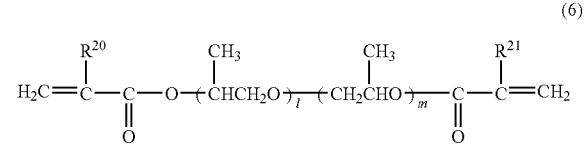
(6)

wherein $R^{20}$ and $R^{21}$ are each independently a hydrogen atom or methyl group, and "l" and "m" are each an integer of not less than 0, with the proviso that when $R^{20}$ and $R^{21}$ are both methyl groups, (l+m) is not less than 2 and less than 7 as an average value, when $R^{20}$ is a methyl group and $R^{21}$ is a hydrogen atom, (l+m) is not less than 2 and less than 5 as an average value, and when $R^{20}$ and $R^{21}$ are both hydrogen atoms, (l+m) is not less than 2 and less than 3 as an average value.

3. The photochromic curable composition according to claim 2, wherein the component [D] contains a polyfunctional urethane (meth)acrylate having a (meth)acryl equivalent of not less than 100 and less than 600.

4. The photochromic curable composition according to claim 1, wherein the component [D] contains a bifunctional (meth)acrylate monomer represented by the following formula (5):

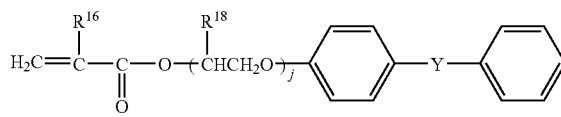

wherein $R^{16}$ and $R^{17}$ are each independently a hydrogen atom or methyl group, $R^{18}$ and $R^{19}$ are each independently a hydrogen atom or methyl group, the group Y is any one of the groups

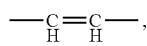

—C(CH$_3$)$_2$—, —C(CH$_3$)(C$_6$H$_5$)—, and "j" and "k" are each an integer of not less than 1, with the proviso that when $R^{16}$ and $R^{17}$ are both methyl groups, (j+k) is not less than 2 and less than 7 as an average value, when $R^{16}$ is a methyl group and $R^{17}$ is a hydrogen atom, (j+k) is not less than 2 and less than 5 as an average value, and when $R^{16}$ and $R^{17}$ are both hydrogen atoms, (j+k) is not less than 2 and less than 3 as an average value.

5. The photochromic curable composition according to any one of claims 1, 2, 3, and 4, wherein the photochromic compound [E] contains [E1] a chromene compound represented by the following formula (7):

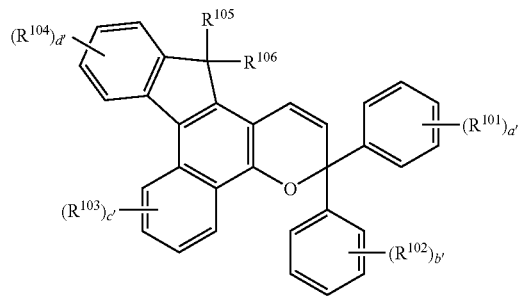

wherein $R^{101}$ is a cyclic or acyclic monovalent amino group having 2 to 10 carbon atoms which may contain a hetero atom except nitrogen, $R^{102}$, $R^{103}$, $R^{104}$, $R^{105}$ and $R^{106}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{105}$ and $R^{106}$ may be bonded together to form a ring, "a'", "b'", "c'" and "d'" represent the numbers of substituents of $R_{101}$, $R^{102}$, $R^{103}$ and $R^{104}$, respectively, "a'" and "b'" are each an integer of 0 to 5, and "c'" and "d'" are each an integer of 0 to 4, with the proviso that when "a'", "b'", "c'" and "d'" are each not less than 2, $R^{101}$'s, $R^{102}$'s, $R^{103}$'s and $R^{104}$'s may be the same or different.

6. The photochromic curable composition according to claim 5, wherein the photochromic compound [E] further contains [E2] a chromene compound represented by the following formula (8):

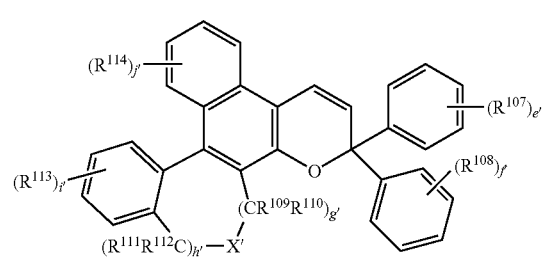

wherein $R^{107}$, $R^{108}$, $R^{113}$ and $R^{114}$ are each independently a hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{109}$, $R^{110}$, $R^{111}$ and $R^{112}$ are each independently a hydrogen atom, hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, $R^{109}$ and $R^{110}$, $R^{111}$ and $R^{112}$, and $R^{109}$ and $R^{111}$ may be bonded together to form a ring, and X' is an oxygen atom, single bond, group represented by the following formula (9):

wherein $R^{115}$ and $R^{116}$ are each independently a hydrogen atom, hydroxyl group, alkyl group, cycloalkyl group, alkoxy group, aralkyl group, aralkoxy group, aryl group, substituted amino group having an alkyl group or aryl group, heterocyclic group having a nitrogen atom as a hetero atom and bonded by the nitrogen atom, cyano group, nitro group, halogen atom, halogenoalkyl group or halogenoalkoxy group, and $R^{115}$ and $R^{116}$ may be bonded together to form a ring, or group represented by the following formula (10):

$$NR^{117} \qquad (10)$$

wherein $R^{117}$ is a hydrogen atom, hydroxyl group, alkyl group, cycloalkyl group, alkoxy group, aralkyl group, aralkoxy group or aryl group, "e'", "f'", "g'", "i'", and "j'" represent the numbers of substituents of $R^{107}$, $R^{108}$, $CR^{109}R^{110}$, $CR^{111}R^{112}$, $R^{113}$ and $R^{114}$, respectively, "e'" and "f'" are each an integer of 0 to 5, "g'" and "h'" are each an integer of 0 to 2, "i'" and "j'" are each an integer of 0 to 4, when "e'", "f'", "g'", "h'", "i'" and "j'" are each not less than 2, $R^{107}$'s, $R^{108}$'s, $CR^{109}R^{110}$'s, $CR^{111}R^{112}$'s, $R^{113}$'s, $R^{114}$'s, may be the same or different.

7. The photochromic curable composition according to claim 6, wherein 10 to 300 parts by mass of the chromene compound [E2] represented by the above formula (8) is present based on 100 parts by mass of the chromene compound [E1] represented by the above formula (7).

* * * * *